United States Patent
Burness et al.

(10) Patent No.: US 9,342,405 B2
(45) Date of Patent: May 17, 2016

(54) HIERARCHICAL DATA COMPRESSION TESTING

(75) Inventors: John Oliver Burness, Colorado Springs, CO (US); Richard Franklin Lary, Colorado Springs, CO (US)

(73) Assignee: SEAGATE TECHNOLOGY LLC, Scotts Valley, CA (US)

( * ) Notice: Subject to any disclaimer, the term of this patent is extended or adjusted under 35 U.S.C. 154(b) by 855 days.

(21) Appl. No.: 13/035,641

(22) Filed: Feb. 25, 2011

(65) Prior Publication Data

US 2012/0221533 A1 Aug. 30, 2012

(51) Int. Cl.
*G06F 17/30* (2006.01)
*G06F 11/10* (2006.01)

(52) U.S. Cl.
CPC .................................. *G06F 11/1076* (2013.01)

(58) Field of Classification Search
CPC ................................................... G06F 11/1076
USPC ......................................................... 707/690
See application file for complete search history.

(56) References Cited

U.S. PATENT DOCUMENTS

| | | | | |
|---|---|---|---|---|
| 5,572,661 A * | 11/1996 | Jacobson | ...................... | 714/6.32 |
| 8,117,158 B1 * | 2/2012 | Chatterjee et al. | ............ | 707/638 |
| 2006/0085594 A1 * | 4/2006 | Roberson et al. | ............. | 711/114 |
| 2008/0281777 A1 * | 11/2008 | Sambotin | ......................... | 707/2 |
| 2009/0083504 A1 * | 3/2009 | Belluomini et al. | .......... | 711/162 |
| 2010/0131773 A1 * | 5/2010 | Cherian et al. | ................ | 713/193 |

* cited by examiner

*Primary Examiner* — Etienne Leroux
*Assistant Examiner* — Dara J Glasser
(74) *Attorney, Agent, or Firm* — Hall Estill Attorneys at Law

(57) ABSTRACT

A hierarchical compression tester and associated method employs a grid-based storage capacity wherein a storage unit is defined by a grouping of data blocks. Each data block is stored in one of a plurality of storage devices. Each stored data block has a data portion and a data integrity field (DIF) including a data reliability qualifier (DRQ) indicating whether the respective data portion is valid. The tester also has a logical device allocation map that includes a storage unit descriptor array that identifies one or more storage units corresponding to a selected logical address. The logical device allocation map has a DIF array that identifies whether any of the data blocks in the one or more storage units corresponding to the selected logical address includes invalid data.

17 Claims, 20 Drawing Sheets

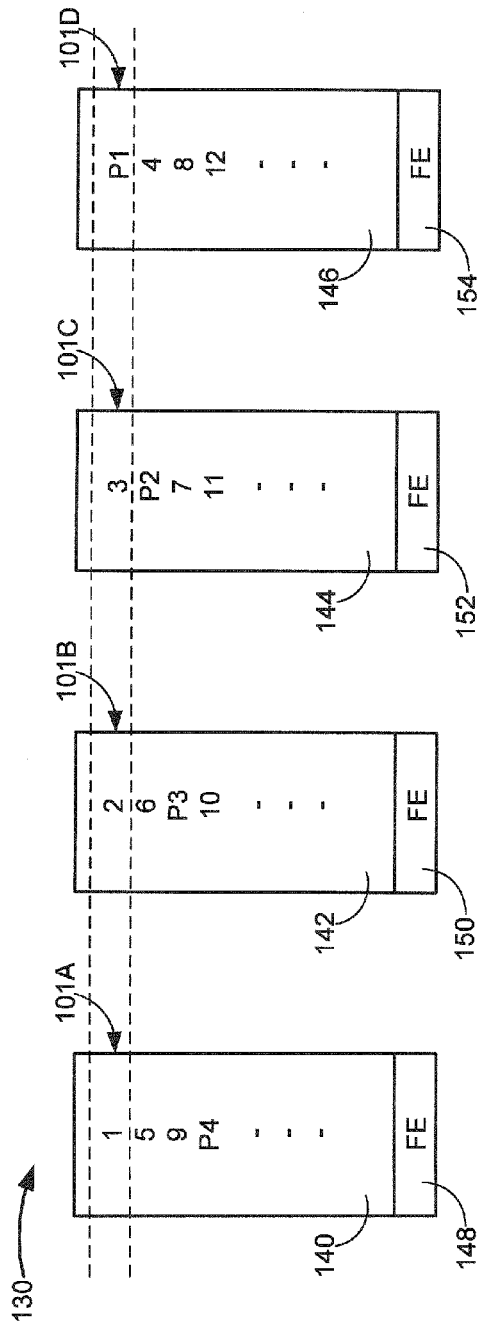

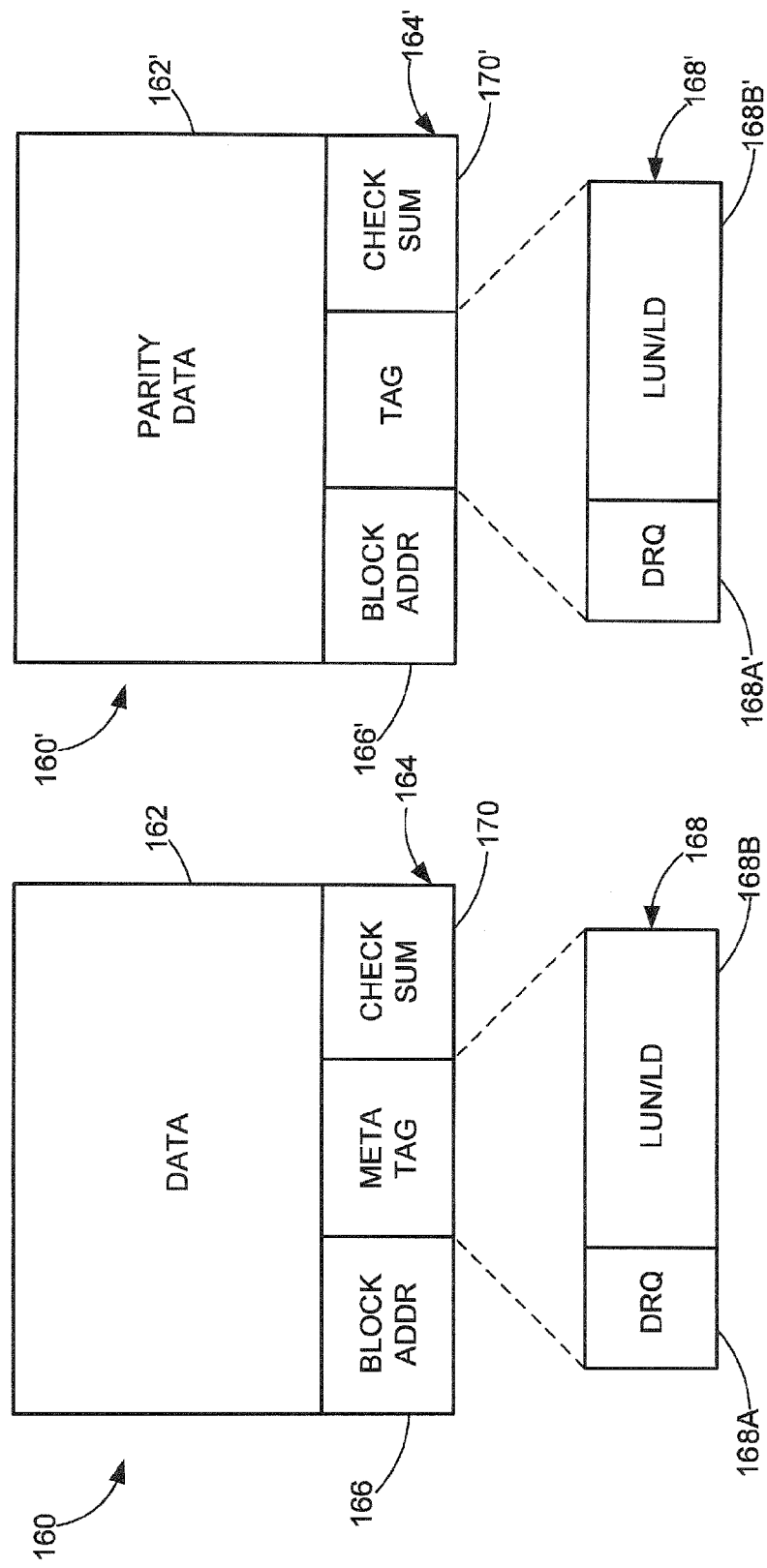

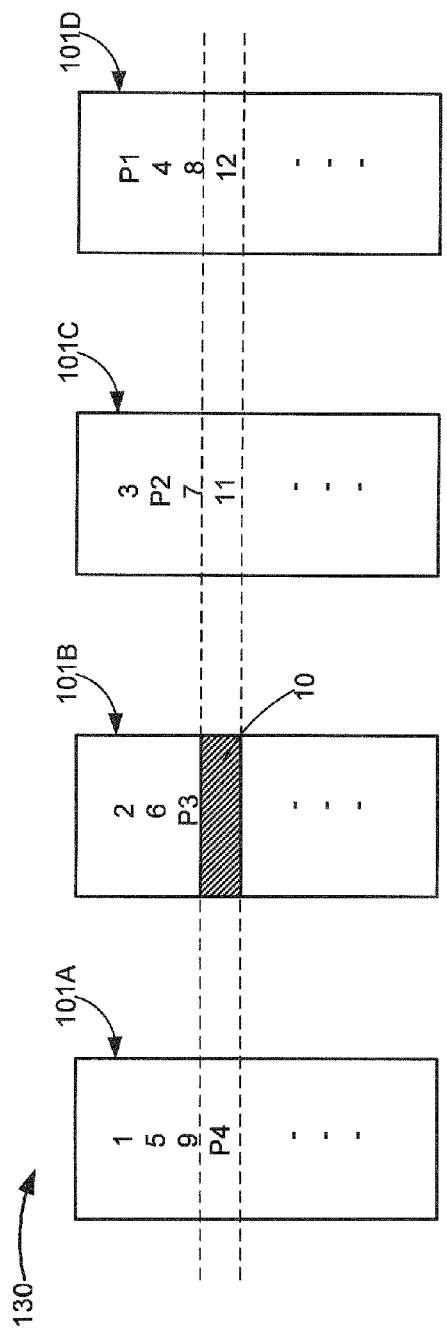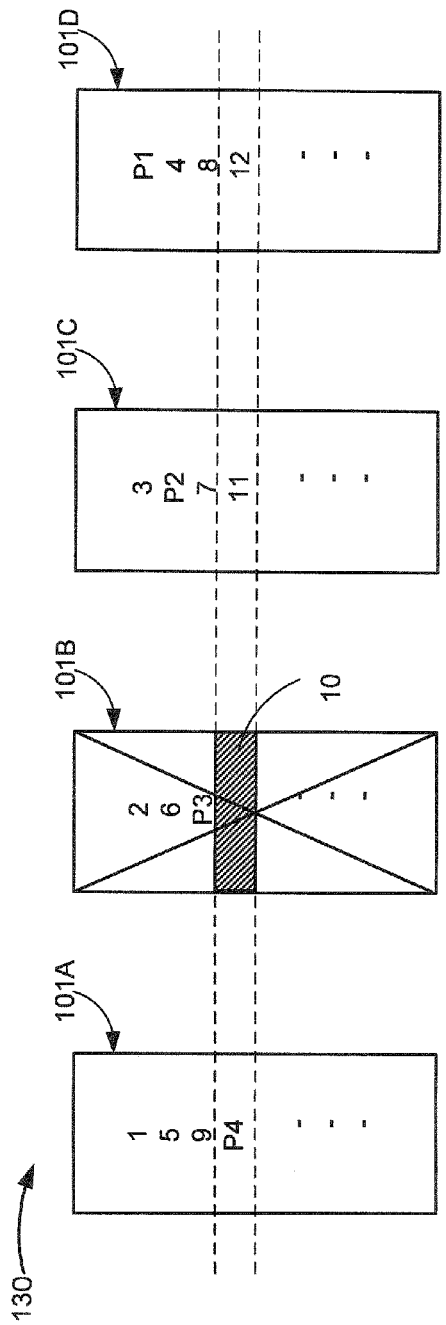

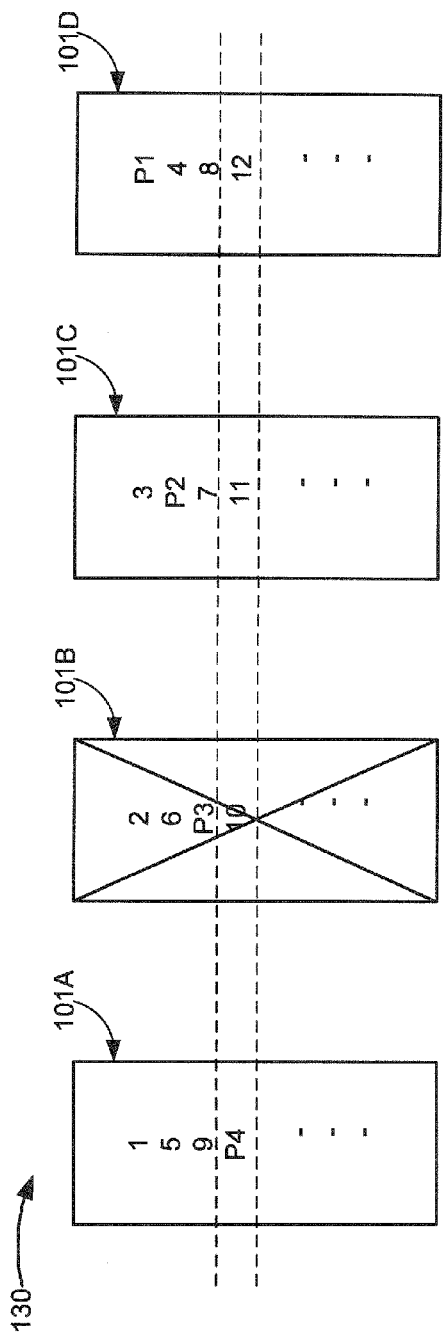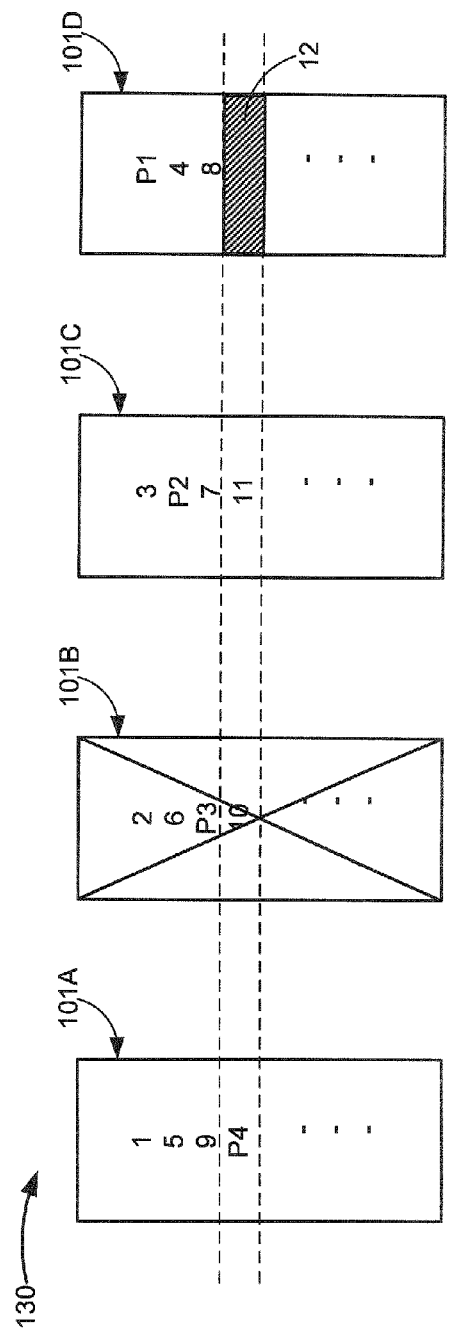

| A-1 | A-2 | A-3 | A-4 | E-5 | E-6 | E-7 | E-8 |
|---|---|---|---|---|---|---|---|
| B-8 | B-1 | B-2 | B-3 | F-4 | F-5 | F-6 | F-7 |
| C-7 | C-8 | C-1 | C-2 | G-3 | G-4 | G-5 | G-6 |
| D-6 | D-7 | D-8 | D-1 | H-2 | H-3 | H-4 | H-5 |
| I-10 | I-9 | I-12 | I-11 | M-14 | M-13 | M-16 | M-15 |
| J-9 | J-16 | J-11 | J-10 | N-13 | N-12 | N-15 | N-14 |
| K-16 | K-15 | K-10 | K-9 | O-12 | O-11 | O-14 | O-13 |
| L-15 | L-14 | L-9 | L-16 | P-11 | P-10 | P-13 | P-12 |

| 13P | 5P | 15P | 7P | 9P | 1P | 11P | 3P |
|---|---|---|---|---|---|---|---|
| 14P | 6P | 16P | 8P | 10P | 2P | 12P | 4P |

| EP | MP | FP | NP | AP | IP | BP | JP |
|---|---|---|---|---|---|---|---|
| GP | OP | HP | PP | CP | KP | DP | LP |

FIG. 15

HIERARCHICAL DATA COMPRESSION TESTING

SUMMARY

In some embodiments an apparatus is provided having a storage unit defined by a grouping of data blocks. Each data block is stored in one of a plurality of storage devices. Each stored data block has a data portion and a data integrity field (DIF) including a data reliability qualifier (DRQ) indicating whether the respective data portion is valid. A map is stored in memory and is indexable by logical address to identify whether any of a plurality of the storage units has at least one stored DRQ value indicating that the corresponding data portion is invalid.

In some embodiments a hierarchical compression tester stored in a computer readable medium employs a grid-based storage capacity wherein a storage unit is defined by a grouping of data blocks. Each data block is stored in one of a plurality of storage devices. Each stored data block has a data portion and a data integrity field (DIF) including a data reliability qualifier (DRQ) indicating whether the respective data portion is valid. The tester also has a logical device allocation map that includes a storage unit descriptor array that identifies one or more storage units corresponding to a selected logical address. The logical device allocation map has a DIF array that identifies whether any of the data blocks in the one or more storage units corresponding to the selected logical address includes invalid data.

In some embodiments a method is provided that includes steps of receiving a data access request in a grid-based storage system in which a storage unit is defined by a grouping of data blocks, each data block stored in one of a plurality of storage devices, each stored data block having a data portion and a data integrity field (DIF) including a data reliability qualifier (DRQ) indicating whether the respective data portion is valid. The method also includes indexing a data structure that is stored in memory according to a logical address to access a DIF array that indicates whether any of a plurality of the storage units corresponding to the logical address has an invalid data portion.

BRIEF DESCRIPTION OF THE DRAWINGS

FIGS. 4A and 4B diagrammatically depict a storage array configuration for reliably storing data in accordance with related art solutions.

FIGS. 5A and 5B diagrammatically depict stored data blocks that include a data integrity field (DIF) storing a data reliability qualifier (DRQ) in accordance with embodiments of the present invention.

FIGS. 6A-6C diagrammatically depict a storage array configuration for reliably storing data in accordance with embodiments of the present invention.

FIGS. 7A and 7B diagrammatically depict an alternative storage array configuration for reliably storing data in accordance with embodiments of the present invention.

FIG. 15 diagrammatically depicts a user/parity grid adapted for RAID 5 and RAID 6 levels.

DETAILED DESCRIPTION

Figure 1:
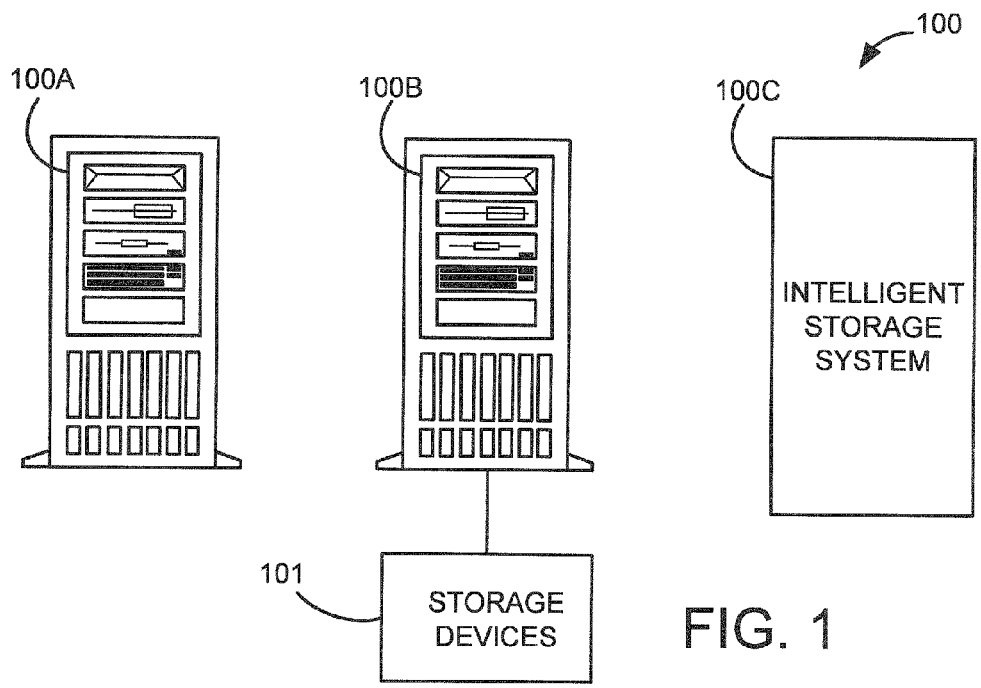
FIG. 1 is a diagrammatical depiction of exemplary operating systems in which various embodiments of the present invention can be employed.

FIG. 1 depicts exemplary operating systems in which embodiments of the present invention can be employed, such as in a computer 100A, or in a server 100B with internal or attached data storage devices 101, or in an intelligent storage system 100C. Intelligent storage system 100C is representative of storage systems that can have intelligent controllers and interfaces and that can have one or more data storage arrays.

Operating systems 100 each contain at least one central processing unit (CPU), a plurality of data storage devices 101 defining a data storage capacity, and metadata describing the configuration of the data storage capacity. By "configuration" it is meant that a description is provided to the system 100 regarding whether particular portions of the storage capacity are being used to store data, or "allocated" space, as opposed to the portions that are available for storing data, or "allocatable" space. The metadata can also define whether stored data is reliable, or valid, such as when the stored data accurately reflects the current state of the storage system, as opposed to it being invalid, such as when the stored data inaccurately reflects the current state of the storage system.

Other operating systems suited for use with various embodiments of the present invention include additional data storage devices 101, additional data storage arrays, additional data storage device controllers or network interface controllers, and the like, that are not depicted in FIG. 1. For example, embodiments of the present invention can be used in a system 100 that includes at least two data storage devices 101 and one controller. Embodiments of the present invention can be employed in simple systems having little or no fault tolerance redundancy to highly redundant systems having no single point of failure.

Figure 2:
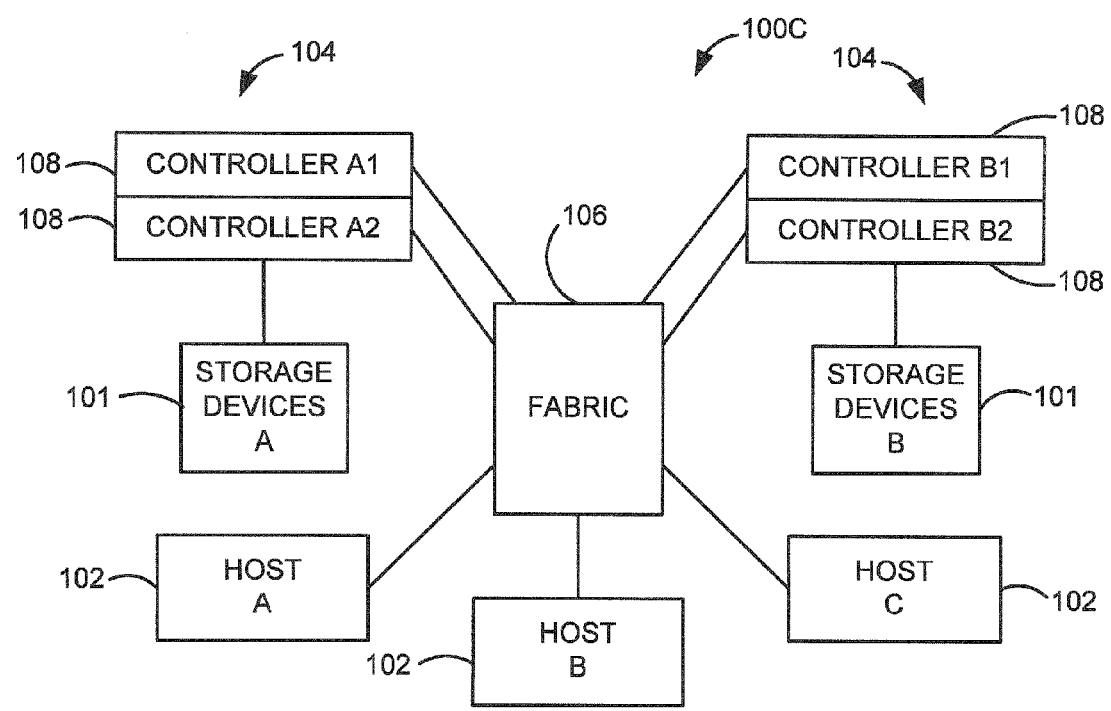
FIG. 2 is a top level functional block depiction of a computer-based system characterized as a wide-area network utilizing mass storage.

To illustrate an exemplary environment in which presently preferred embodiments of the present invention can be advantageously practiced, FIG. 2 shows a computer-based system 100C characterized as a wide area network (WAN) utilizing mass storage.

The system 100C includes a number of host computers 102, respectively identified as hosts A, B, and C. The host computers 102 interact with each other as well as with a pair of data storage arrays 104 (denoted A and B, respectively) via a fabric 106. The fabric 106 is preferably characterized as fibre-channel based switching network, although other configurations can be utilized as well including the Internet.

Each array 104 includes a pair of controllers 108 (denoted A1, A2 and B1, B2) and a set of data storage devices 101, such as solid state drives or disc drives. The controllers 108 and data storage devices 101 preferably utilize a fault tolerant arrangement so that the various controllers 108 utilize parallel, redundant links and at least some of the user data stored by the system 100C is stored in a redundant format within at least one set of the data storage devices 101.

It is further contemplated that the A host computer 102 and the A data storage array 104 can be physically located at a first site, the B host computer 102 and B storage array 104 can be physically located at a second site, and the C host computer 102 can be yet at a third site, although such is merely illustrative and not limiting.

Figure 3:
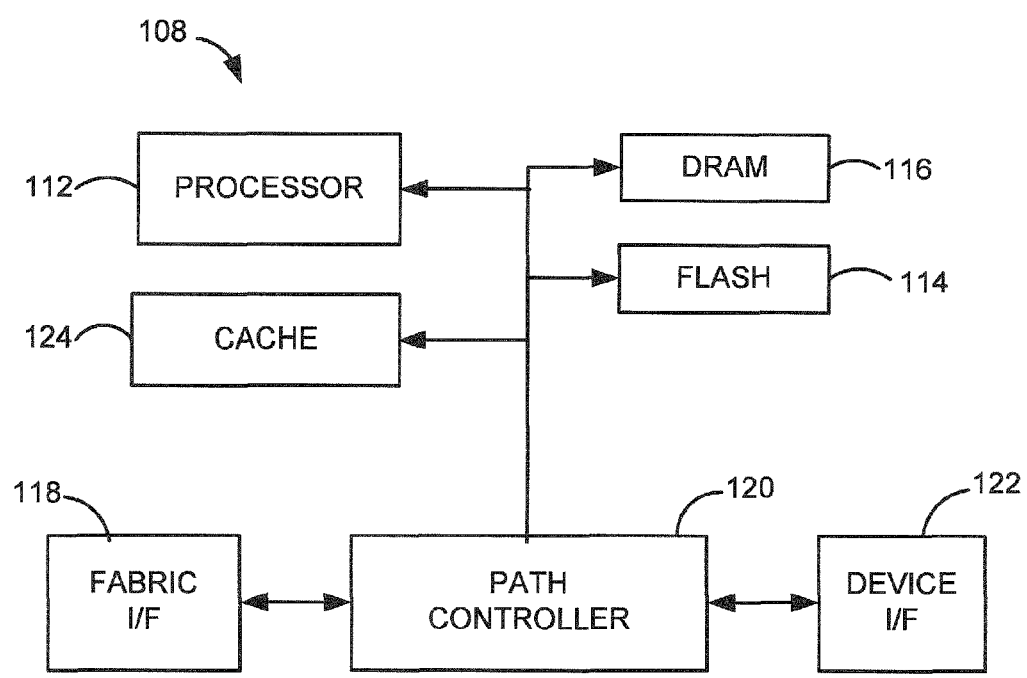
FIG. 3 provides a functional block diagram illustrating a selected one of the controllers of FIG. 2.

FIG. 3 illustrates a selected one of the controllers 108 in greater detail. The controller 108 can be embodied in a single integrated circuit, or distributed among a number of discrete circuits as desired. A main processor 112, preferably characterized as a programmable, computer processor, provides control in accordance with programming steps and processing data preferably stored in non-volatile memory 114 (such as flash memory or similar) and in dynamic random access memory (DRAM) 116.

A fabric interface (I/F) circuit 118 communicates with the other controllers 108 and the host computers 102 via the fabric 106 (FIG. 2), and a device I/F circuit 122 communicates with the storage devices 101 (FIG. 1). The I/F circuits 118, 122 and a path controller 120 form a communication path to pass commands and data between the storage array 104 and the host 102, such as by employing the cache memory 124. Although illustrated discretely, it will be understood that the path controller 120 and the I/F circuits 118, 122 can be unitarily constructed.

The data storage capacity of an array 104, defined by the extent of the data storage devices 101 in a given array 104, is organized into logical units (LUNs) that can be written to and read from the array 104. System configuration information defines the relationship between user data, and any associated parity and mirror data, with the respective storage locations. The system configuration furthermore identifies the relationship between blocks of storage capacity allocated to user data and the memory storage locations, such as logical block addresses (LBA). The system configuration can furthermore include virtualization by defining virtual block addresses that are mapped to logical block addresses.

System configuration information is changed when storage capacity is allocated, such as when saving new files or enlarging existing files, or after storage capacity is deallocated, such as when deleting files or reducing the size of existing files. System metadata defines file allocation information and other data structures that support allocation processes.

FIG. 4A illustrates a storage array group 130 that is used in a RAID configuration in accordance with related art solutions. The array group 130 includes storage devices 101A, 101B, 101C and 101D. Devices 101A, 101B, 101C and 101D store data blocks 1-12 in a RAID 5 configuration as shown. There are four RAID slivers illustrated, with one sliver illustrated as blocks 1, 2, 3 and P1. The data blocks are each entirely stored in respective portions 140, 142, 144 and 146 of devices 101A, 101B, 101C and 101D. Portions 148, 150, 152 and 154 store metadata information about the data blocks. In particular, portions 148, 150, 152 and 154 store so-called forced error (FE) bits. These FE-bits are used to signify if the data in the associated data blocks on the respective drives are unreliable. For example, an FE bit in portion 148 of device 101A is associated with data block 1.

FIG. 4B shows an FE-bit table 156 that can be stored in memory, such as cache memory 124 in FIG. 3. In operation, controller 108 will access FE-bit table 156 when the operating environment requests access to the array group 130. In this way, controller 108 will know whether the data in the requested data block is unreliable. If an FE bit is set for an accessed data block, controller 108 will send an error message to the operating environment. When writing new data to a block designated as having unreliable data, controller 108 clears the corresponding FE-bit in FE-bit table 156, writes the data to the device and also writes the associated FE-bit stored to the device. However, storing the FE-bits independently to each device perturbs the use of storage space, particularly the distribution of parity and user data in a RAID system with redundancy. Also, writing the data blocks and the FE-bits independently requires extra I/Os to the devices. Likewise, the FE-bit table 156 ultimately uses storage space on media or requires a system where power may never fail, and updating it independently requires additional overhead.

Referring to FIG. 5A, a storage scheme of the present embodiments is illustrated. A data block 160 is shown that includes a data portion 162 and appended information 164. In these illustrative embodiments the appended information is a data integrity field (DIF) 164 that includes an address (BLOCK ADDR) portion thereof 166, usually a virtual block address (VBA) or a logical block address (LBA), a metadata tag (META TAG) portion 168, and a check sum (CHECK SUM) portion 170. The reference tag portion 166 contains information that identifies the logical or virtual address for data portion 162. The check sum portion 170 contains information that is used to detect errors in data portion 162. The metadata tag portion 168 is additionally split into portions 168A and 168B. Portion 168B can contain information about the device, such as a device identifier (logical unit number LUN, or logical device LD). Portion 168A, according to the present embodiments, contains a data reliability qualifier (DRQ) that indicates whether the data in data portion 162 is valid. The DRQ 168A is logically appended to the data block 160 and maintained with identical redundancy as the data portion 162. It should be viewed as a copy of logical metadata in the same sense as the data portion 162 is considered a copy, with possible redundancy, of a logical block of a logical unit created using any of the techniques known as virtualization. Portion 168A can contain additional metadata bits that qualify the data. Some of these bits may also be logical metadata and maintained with identical redundancy to the data portion 162. Some of these bits may be physical metadata and apply only to the particular copy to which they are appended. For example, portion 168A can contain a parity flag bit that indicates that the data block 160 in question contains some form of parity for other user data blocks.

FIG. 5B shows a storage scheme for the parity data according to the present embodiments. A data parity block 160' similarly includes a parity data portion 162' and an appended DIF 164'. The DIF 164' includes an address portion (BLOCK ADDR) 166', usually a parity virtual block address (Parity VBA); a metadata tag (META TAG) portion 168', and a check sum (CHECK SUM) portion 170'. Reference tag portion 166' when qualified by a parity flag in metadata tag portion 168' contains information that identifies the so-called sliver for which parity data portion 160' provides redundancy. In particular, the parity virtual block address in the DIF 164' of the parity data block 160' may specify the virtual block address (VBA) of the data block with the lowest such address of the RAID sliver (where address in this context means address in the virtual unit). Check sum portion 170' contains information that is used to detect errors in parity data portion 160'. Metadata tag portion 168' contains additional portions 168A' and 168B'. Portion 168B' can contain information about the device, such as a device identifier (LUN or LD). Portion 168A', according to the present embodiments, can contain a DRQ bit that is a function of the other DRQ bits in portions 168A. The DRQ parity bit can be generated by an exclusive-OR function of all the other data block DRQ-bits. To illustrate, the bit portions 168A can be exclusive-ORed together to generate the single DRQ parity bit that will saved in portion 168A'. Generally, then, the DRQ parity bit is created as a function of the other DRQ bits in portions 168A in the same sliver.

The present embodiments have several advantages over the scheme described in FIGS. 4A and 4B. First, the additional accessing of a device to write FE-bit information is not required since the separate FE-bit portions 148, 150, 152 and 154 are eliminated. Furthermore, the need to store the FE-bit table is eliminated. Since the FE-bit table maintenance can consume a substantial amount of processing overhead, such elimination will save critical path CPU cycles. Also, considering that the DRQ bit is automatically retrieved when the data is, there is no real performance degradation to check for it being set, which it usually is not.

Figure 6C:
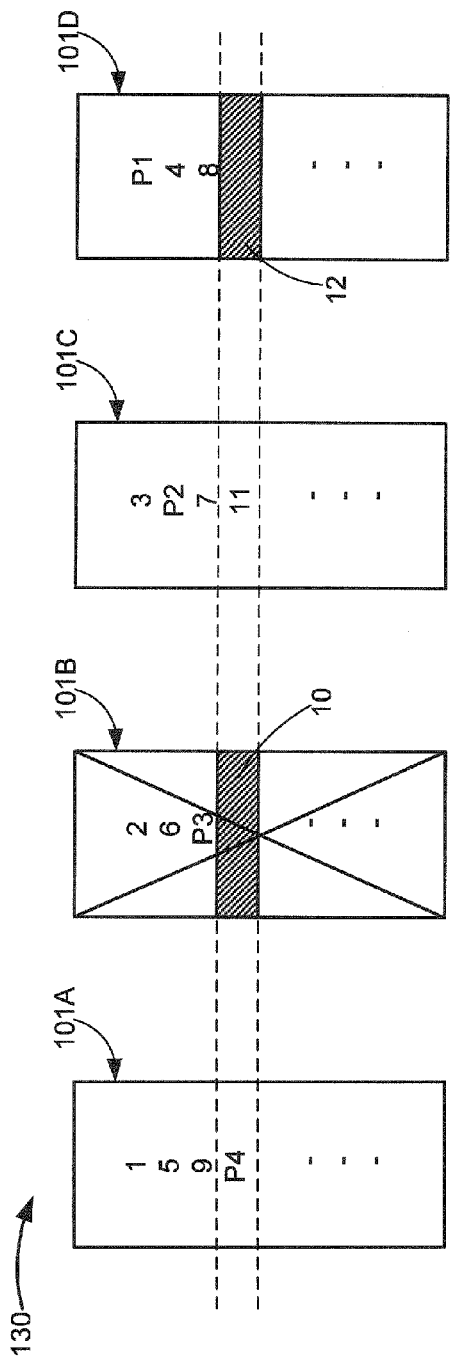

One use of the present embodiments will be described with reference to FIGS. 6A-6C. In FIG. 6A, data block 10 is illustrated as being unreliable. According to the present embodiments, the associated DRQ bit is set and exclusive-ORed with the other DRQ bits stored in portions 168A and stored in portion 168A' of the parity block P4 stored on device 101A. When the data block 10 is subsequently read, the DRQ bit set in portion 168A can be used to indicate its unreliability. Any attempt to reconstruct data block 10 will also reconstruct the DRQ bit in portion 168A since the DRQ parity bit in portion 168A' along with the DRQ bits in the other data blocks 168A allows this reconstruction using the standard exclusive-OR mechanism.

FIG. 6B shows the situation where device 101B that stores block 10 is missing. In that case, a regeneration of data block 10 can be performed but the fact the data is unreliable will be retained via the regeneration of the associated DRQ bit because the associated DRQ parity bit information in portion 168A' of the parity block P4 when combined with the DRQ bits of the other data block portions 168A indicates the data of data block 10 is unreliable.

FIG. 6C shows another situation in which the present embodiments are particularly useful. In that figure, data block 10 is shown as unreliable as well as "missing" (as are all blocks on device 101B) and data block 12 is also shown as unreliable. If an attempt to regenerate data block 10 is made, the regeneration will succeed but the regenerated data will still be shown as unreliable because the parity DRQ bit in portion 168A' of parity data block P4 when combined with other DRQ bits in portions 168A including the DRQ bit in data block 12 showing it as unreliable will produce a DRQ bit for data block 10 that is "1" ("TRUE"). Like data block 10, the DRQ bit associated with data block 12 is saved to portion 168A of data block 12 and combined with the other DRQ bits for data block portions 168 to produce the parity DRQ bit in portion 168A' of parity data block P4.

Another use of the present embodiments will be explained with reference to FIGS. 7A and 7B. FIG. 7A exemplifies when a device 101B is inoperative or "missing" in the array group 130. If a read request is made that resolves to device 101B, the storage system controller receives data blocks P4, 11 and 12 from respective devices 101A, 101C and 101D. The controller will perform error detection of each block to ensure that the data is good (reliable from the point of view of the drive). If the data is good, the storage system controller will exclusive-OR the parity data P4 in device 101A with data blocks 11 and 12 in respective devices 101C and 101D. The result will be the regeneration of data block 10 that was stored on device 101B. For a write to inoperative device 101B, data blocks 11 and 12 in respective devices 101C and 101D will be exclusive-ORed with the new data. The result is new parity data that will be saved in the location of parity data block P4 in device 101A. The new parity data block will have associated information data that includes a parity DRQ bit that is the exclusive-OR of the DRQ bits associated with data blocks 11 and 12 and the DRQ bit for data block 10 itself, which may or may not be "0" at the discretion of the issuer of the write.

FIG. 7B shows when device 101B is inoperative and data block 12 of device 101D is unreliable. As described above, if a read request is made that accesses inoperative device 101B, the storage system controller receives data blocks P4, 11 and 12 from respective devices 101A, 101C and 101D. The controller will perform error detection of each block to ensure that the data is good. If any of the data is not good, then the controller informs the host environment that the read cannot be performed. Otherwise, the data block 10 is regenerated as well as its associated DRQ bit. If the regenerated DRQ bit indicates the data is reliable, then the read can succeed. The use of the data in data block 12 for regeneration is independent of the quality of that data at the logical block level. If the device declares it as being good, then it can be used for regeneration as shown in this case.

With further reference to FIG. 7B, writing data will be explained. In the case where data is to be written to block 10 of missing device 101B and block 12 of device 101D is unreadable (not good), the data in block 10 cannot be stored in the parity data in block P4 of device 101A because block 12 is unreadable. That is, the data in block 10 would normally be stored by generating a new parity block that is the exclusive-OR of the data in block 10 that is being written and the data in blocks 11 and 12. Normally, this situation results in a block that cannot be written. The data in block 12, however, can be made good by writing it with either best guess data or some pattern. The DRQ bit in the associated information data for block 12 will be set to "1" to remember that the data in block 12 is unreliable. Now the data in block 10 can be stored in the parity because the data in block 12 has been made good. The parity DRQ bit associated with parity block P4 will be generated using exclusive-OR from the new DRQ bit for data block 10, the existing DRQ bit for data block 11 and the set DRQ bit that represents the data in block 12 as unreliable.

Figure 8:
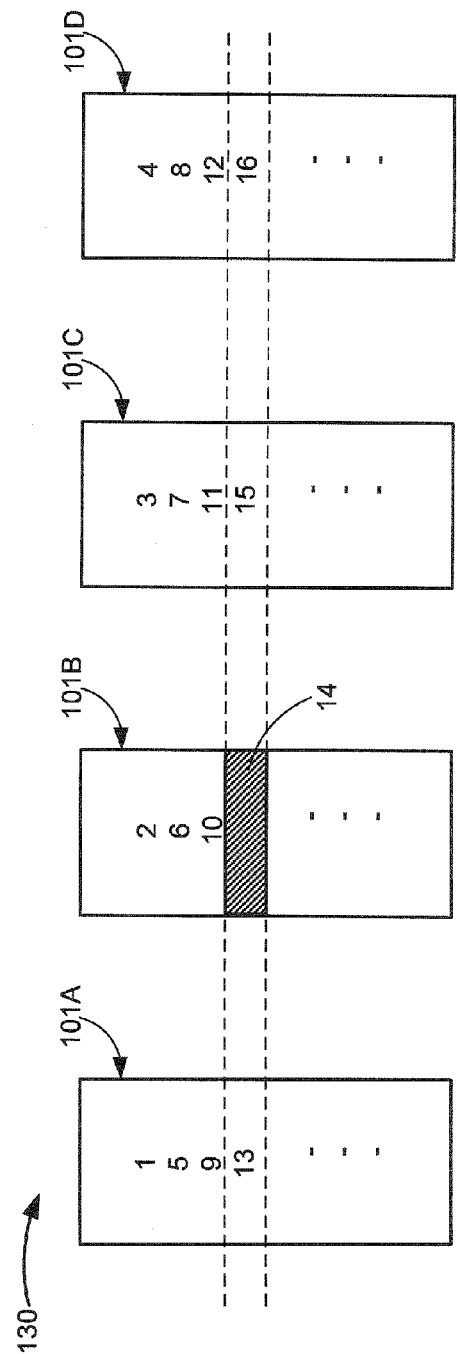
FIG. 8 diagrammatically depicts another alternative storage array configuration for reliably storing data in accordance with embodiments of the present invention.

FIG. 8 shows another use of the present embodiments. Shown is the array 130 that includes devices 101A, 101B, 101C and 101D configured as RAID 0. In other words, the data is striped but there is no parity. As such, the data is not recoverable. In the case where data block 14 (shown as the striped-out data block to in device 101B) is unreadable (not good), the data block is made readable again by either writing a best guess of the data in data block 14, or a pattern. Such a pattern can be all zeros. However, the data in data block 14 cannot be trusted and is, therefore, unreliable. So the associated DRQ bit is set to indicate that the data in data block 14 is not trustworthy. The DRQ should be understood as logical metadata associated with logical blocks even for RAID-0, where there is no redundancy.

Although the DRQ bits are disclosed as part of the DIF, the DRQ bit does not have to be contained like that. The DRQ bit can simply be appended (or prepended) to the data portion 162, or part of other data appended to the data portion 162. This eliminates the case where the data reliability information becomes unavailable, while the data is available (which could certainly happen with the separate FE-bit table of FIG. 4A), thus having no way to figure out which data is reliable and which is not. With these embodiments, if the data is available, then the data reliability information is available, so the data's reliability can always be determined. Generally, the present embodiments accompany data with reliability information, such as (without limitation) appending or embedding. The mechanism proposed for the specific DRQ bit arrangement can be extended to incorporate other logical metadata which qualifies the data.

Figure 9:
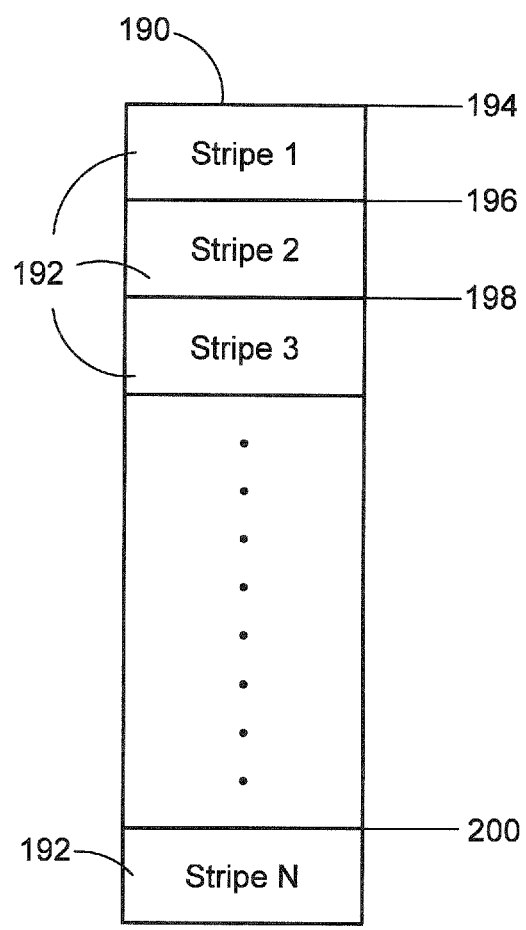
FIG. 9 diagrammatically depicts a data storage device memory.

FIG. 9 is a diagrammatical representation of an overview in terms of a storage map 190 showing a portion of the storage capacity contained in the data storage device 101 (FIG. 1). In the following description, "stripe" is used in a generic sense, and not only in terms of a RAID stripe as defined by the RAID Advisory Board (RAB). The storage map 190 depicts stripes 192 (sometimes referred to herein as "sub partitions" 192), each containing a predefined portion of the storage capacity. The amount of storage capacity in stripes 192 can reflect the type of storage applications of the system. Each stripe 192 starts at an LBA. For purposes of illustration, stripe 1 begins at LBA 194, stripe 2 begins at LBA 196, and stripe 3 begins at LBA 198. A plurality of other stripes 192 can be defined up to Stripe N that begins at LBA 200. Preferably, the end of one stripe 192 is immediately adjacent the next stripe 192 so that there is no unused storage capacity between adjacent stripes 192.

Figures 10, 11:
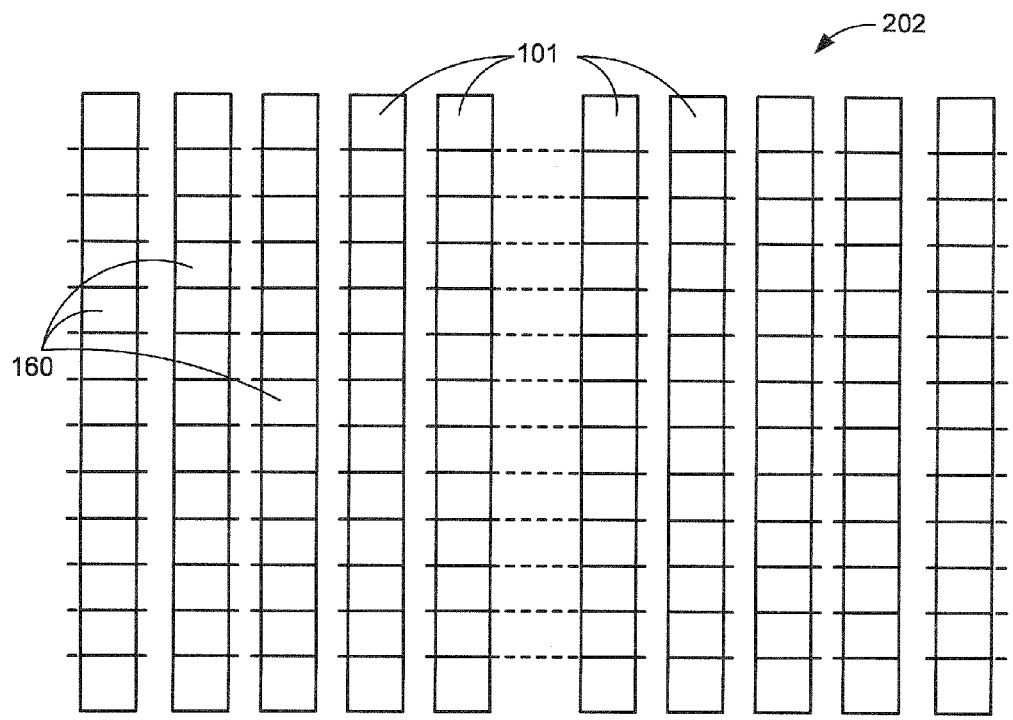
FIG. 10 diagrammatically depicts a grid-based data storage capacity.
FIG. 11 diagrammatically depicts a sheet organization table for data storage sheets employing ten drives in the grid.

FIG. 10 depicts a grid 202 based storage capacity arrangement for the system 100C. Each column in the grid 202 corresponds to one data storage device 101, or storage domain, and each row in the grid 202 corresponds to a plurality of data blocks 160 (FIG. 5A) defining the stripes 192 of data, with one data block 160 stored in each data storage device 101. Data blocks 160 in one row can start at the same or at different LBAs.

Spare capacity is distributed across sub-partitions of data storage device 101 partitions. Accordingly, data blocks 160 can be allocated to store data or can be spares. Data blocks 160 containing data store such things as user information, mirror data, or parity data. Spare data blocks 160 can be configured to exist only on specific data storage devices 101, or can be distributed across some or all data storage devices 101 in a predetermined manner. The designation of spare data blocks 160 can vary from one grid 202 to the next. A group of consecutive grids 202 is termed a sheet, and is sometimes referred to as a grid group. The sub-partitions align with the sheets, and are termed "sheet cells" ("scells"). The data storage devices 101 employed to form a grid 202 is termed a book.

FIG. 11 depicts a sheet organization table 204 having sheet versions 206, 208, 210, 212, and 214, for sheets employing grids 202 with ten data storage devices 101 (consecutively denoted A, C, E, G, I, B, D, F, H, and J) and with a spare capacity of two data storage devices 101 that is distributed across all the data storage devices 101. The sheet organization table 204 defines sheet organization versions 216, denoting which data storage devices 101 are spares (as indicated by the letter "s") and which data storage devices 101 contain data (as indicated by the letter "d"). It will be noted that preferably the arrangement of data and spare scells changes for each different sheet version 216. This allows data blocks 160 and spare data blocks 160 to be distributed across all of the data storage devices 101 within the book, such that all of the data storage devices 101 can be simultaneously accessing data in a multithreaded environment. Such a sparing arrangement offers higher performance than systems 100 where all spare data blocks 160 are contained in less than all the data storage devices 101.

In the illustrative embodiments shown wherein two or more data storage devices 101 provide spare capacity for each of the versions 216, data storage devices 101 can be configured into groups and pairs. In table 204, for example, drives A&B, C&D, E&F, G&H, and I&J form pairs, and sparing can be allocated such that data blocks 160 contained in the pair have the same designation, either spare or data, for each sheet version 216. Data storage devices 101 can also be organized into groups. In table 204, for example, a first group 218 contains drives A, C, E, G, and I, and a second group 220 contains drives B, D, F, H and J. Pairing can be employed for RAID 1 data formats such that one member of the pair contains user data (primary data) and the other member of the pair contains an identical copy in the form of mirror data (secondary data) or vice-versa. Grouping can also be employed for RAID 5 data formats such that user data is stored in one group 218, 220 and parity data is stored in the other group 218, 220. As such, pairing and grouping of data storage devices 101 is advantageously employed when configuring fault tolerant data storage formats. The pairing and grouping of FIG. 11 is exemplary and there is no constraint as to which data storage devices 101 form pairs or groups, but a given data storage device 101 (all partitions thereof) is always paired with one and only one particular other data storage device 101 for maximum fault tolerance.

If a data storage device 101 fails, data from functioning data storage devices 101 are copied or reconstructed and written to spare data blocks 160, as is specified by the sheet organization table 204. In the illustrative embodiments of FIG. 11, the sheet organization table 204 can be a circular table that repetitively cycles through a set of spare versions (drive organization) 216. For example, a sixth sheet (not shown) could be referenced by the same sheet version 206 as the first sheet but be referenced by a different spare version 216 (drive organization). Sheet organization table 204 can be modified to support a different number of versions 216, data storage devices 101, and spare configurations.

The application of the sheet organization table 204 to the grid 202 (FIG. 10) provides a first set of data blocks 160 in a sub partition being designated as spare data blocks 160 and a second set of data blocks 160 in a sub partition that can store user data, mirror data, or parity data. This combination of the sheet organization table 204 (SV1 206) and the grid 202 defines an allocatable storage grid, referred to generally herein as "storage unit" (SU) 222, as shown illustratively in FIG. 12. Each rectangle represents a striped data block 160, and the letter within each rectangle indicates the associated data storage device 101. The SU 222 comprises eight rows spanning eight data storage devices 101. For example, if a stripe size of 128 KB is specified, the SU 222 provides 8 MB of storage capacity. Such SUs 222 within a book can be sequentially numbered or otherwise each assigned a number or a unique identifier.

As noted previously, a plurality of grids 202 (FIG. 10) can be organized into a sheet. Sheets are typically configured in only one storage format, but during some operations, such as RAID level conversion, more than one storage format can exist within a sheet.

Figure 12:
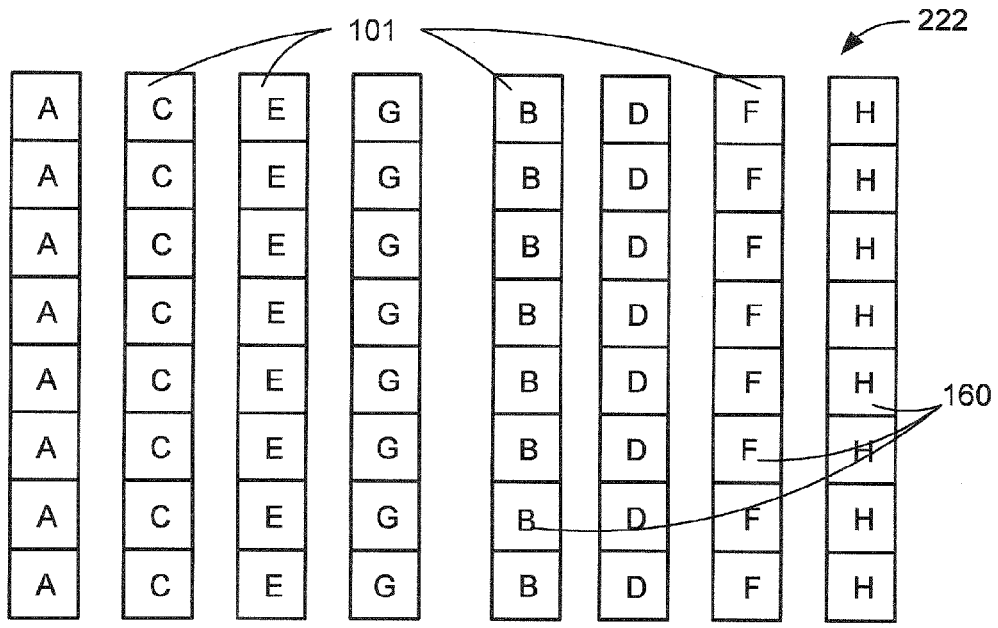
FIG. 12 diagrammatically depicts a data capacity grid.
Figure 13:
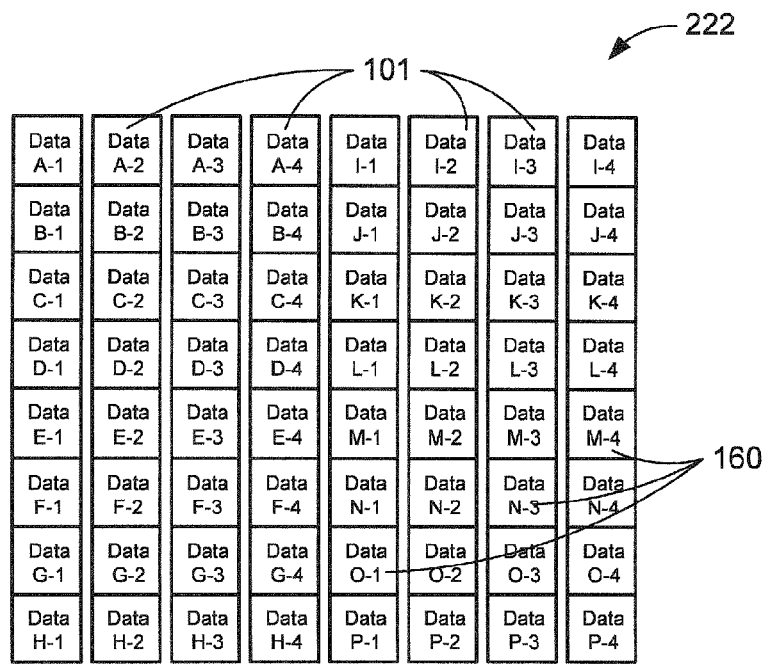
FIG. 13 diagrammatically depicts a user data grid.

FIG. 13 depicts a storage unit (SU) 222 which is similar to SU 222 in FIG. 12 but with all data blocks 160 containing user data, and which are denoted Data A-1, Data A-2, Data A-3, Data A-4, Data B-1, etc. up to Data P-4. Fault tolerance can be provided for data stored in SU 222 through redundant information, such as parity data or mirror data, which is stored in other SUs 222. An SU 222 that is associated with fault tolerance information contained in one or more other SUs 222 is termed a reliable storage unit (RSU). For purposes of this description and the appended claims, the term "SU" contemplates a preselected user data storage capacity with or without associated fault tolerance information. That is, the term "SU" can mean an SU 222 containing user data without any associated fault tolerance information, and the term "SU" can in equivalent alternative embodiments mean an RSU.

Figure 14:
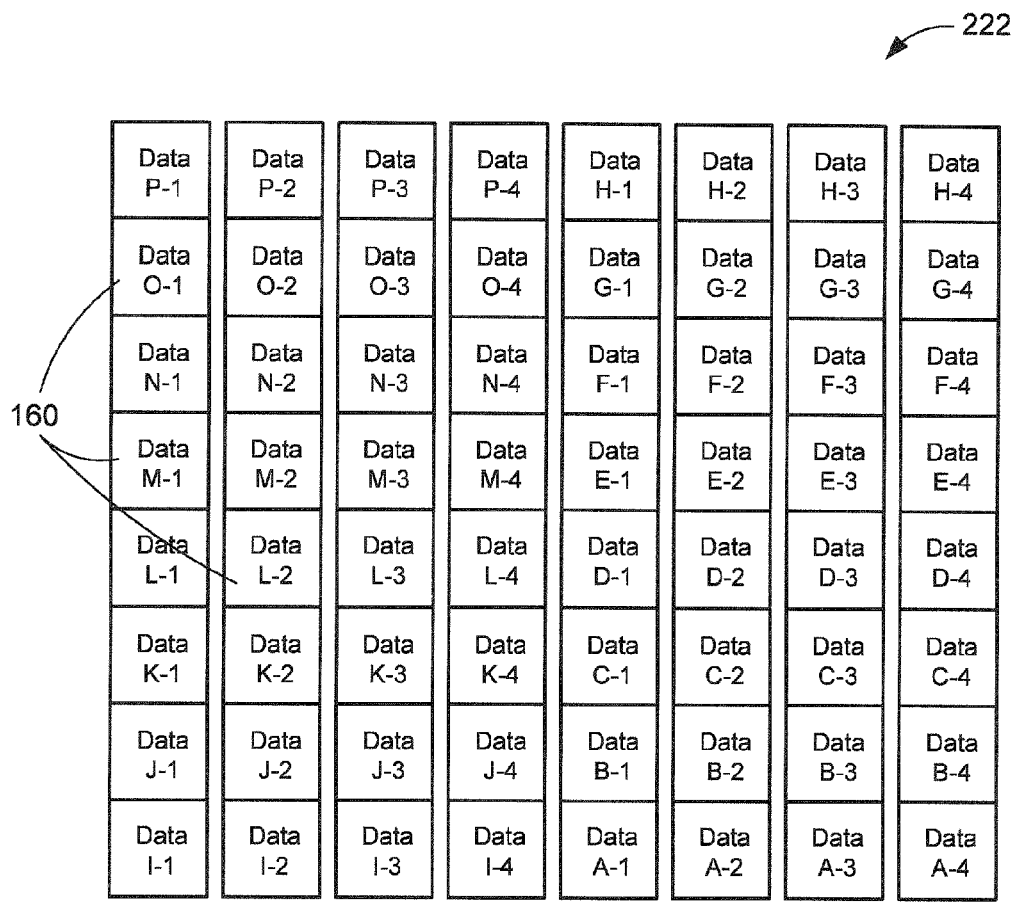
FIG. 14 diagrammatically depicts a RAID 1 mirror data grid for the user data grid of FIG. 13.

FIG. 14 depicts an illustrative RAID 1 mirror SU 222 of the SU 222 depicted in FIG. 13. Data from the left side of SU 222 in FIG. 13 is mirrored in the right side of mirror SU 222 in FIG. 14, creating RAID 1 pairs. That is, for each data block 160 in the SU 222 in FIG. 13 there is a corresponding stripe data block 160 in mirror SU 222 in FIG. 14. For example, stripe A-1 in mirror SU 222 mirrors with respect to stripe A-1 in SU 222 in FIG. 13. It will be noted that the mirrored data is stored in a different data storage device 101 as required for data fault tolerance.

FIG. 15 depicts an SU 222 and a manner for calculating and placing column and row parity values 228, 230. SU 222 is like that of FIG. 13, with each data block 160 in the SU 222 labeled with a letter index and a number index. Letter indices specify row parity stripe sets for RAID 5 that are used to generate the row parity stripes 230. For example, user data stripes A-1, A-2, A-3 and A-4 can be XOR'ed (logically exclusive OR'ed) to produce stripe "AP" in row parity values 230. The number indices specify column parity stripe sets employed to generate diagonal parity for RAID 6 data storage formats. For example, user data stripes A-1, B-1, C-1 and D-1 can be XOR'ed to produce "1 P" in column parity values 228. The eight rows and columns of the SU 222 are used to generate two rows of row parity data 230 and two rows of column parity data 228. For optimal performance the fault tolerance information is not contained within the SU 222 but rather in one or more other SUs 222. Preferably, the parity values 228, 230 could be contained within two different SUs 222 to facilitate RAID format transformation.

Figure 16:
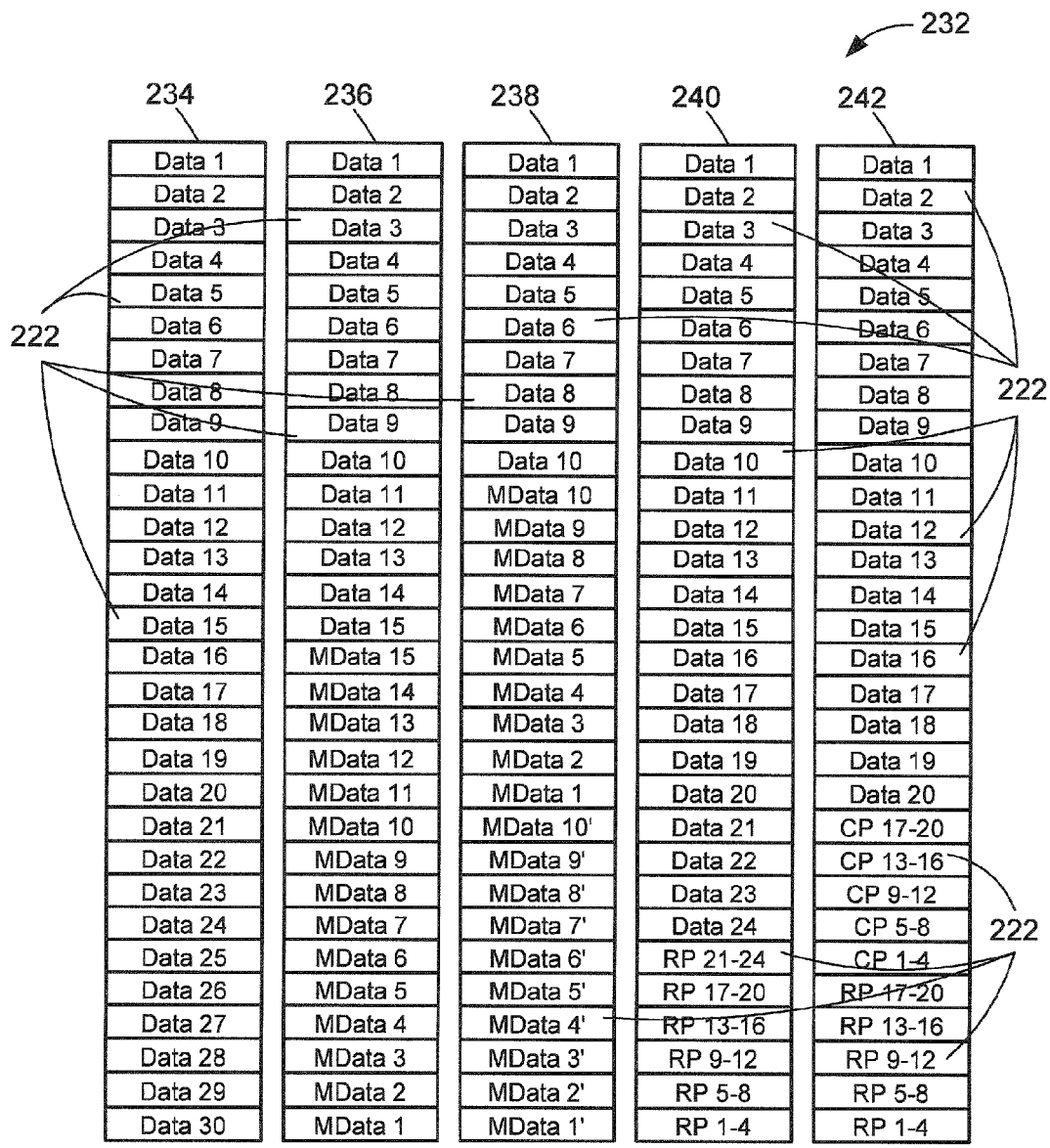
FIG. 16 diagrammatically depicts a grid utilization for various RAID levels.

FIG. 16 depicts a grid utilization chart 232 for sheets 234, 236, 238, 240, and 242, each employing a total of 30 SUs configured according to RAID 0, RAID 1×2, RAID 1×3, RAID 5, and RAID 6, respectively. For RAID 0 (234) the sheet contains 30 SUs 222, labeled Data 1-30. For RAID 1×2 (236) fifteen SUs 222 contain user data, labeled Data 1-15, and fifteen SUs 222 contain mirror data, labeled MData 1-15. For RAID 1×3 (238) ten SUs 224 contain user data labeled Data 1-10, ten SUs 222 contain mirror data, labeled Mdata 1-10, and ten SUs 222 contain alternate mirror data labeled Mdata 1'-10'. Alternate mirror data employs a different ordering of stripes within the grid utilization chart 232 than the mirror data, while maintaining the user data, mirror data, and alternate mirror data as being stored in different data storage devices 101. For RAID 5 (240) 24 SUs 222 contain user data, labeled as Data 1-24, and six SUs 222 contain row parity, labeled RP1-4 to RP21-24. For RAID 6 (242), 20 SUs 222 contain user data, labeled as Data 1-20, five SUs 222 contain row parity labeled RP 1-4 to RP 17-20, and five SUs 222 contain column parity, labeled CP1-4 to CP 17-20.

These configurations illustrate a "packed parity" format where user data is stored exclusively in one portion of a sheet and mirror or parity data (if any) is stored in another portion of the sheet. This provides increased sequential read performance. For the illustrative configuration of FIG. 16 having a combined total arrangement of 30 SUs 222 per sheet, different RAID levels result in different numbers of SUs 222:

| RAID Level | Number of SUs |
|---|---|
| RAID-0 | 30 |
| RAID-1 | 15 |
| RAID-1x3 | 10 |
| RAID-5 | 24 |
| RAID-6 | 20 |

Figure 17:
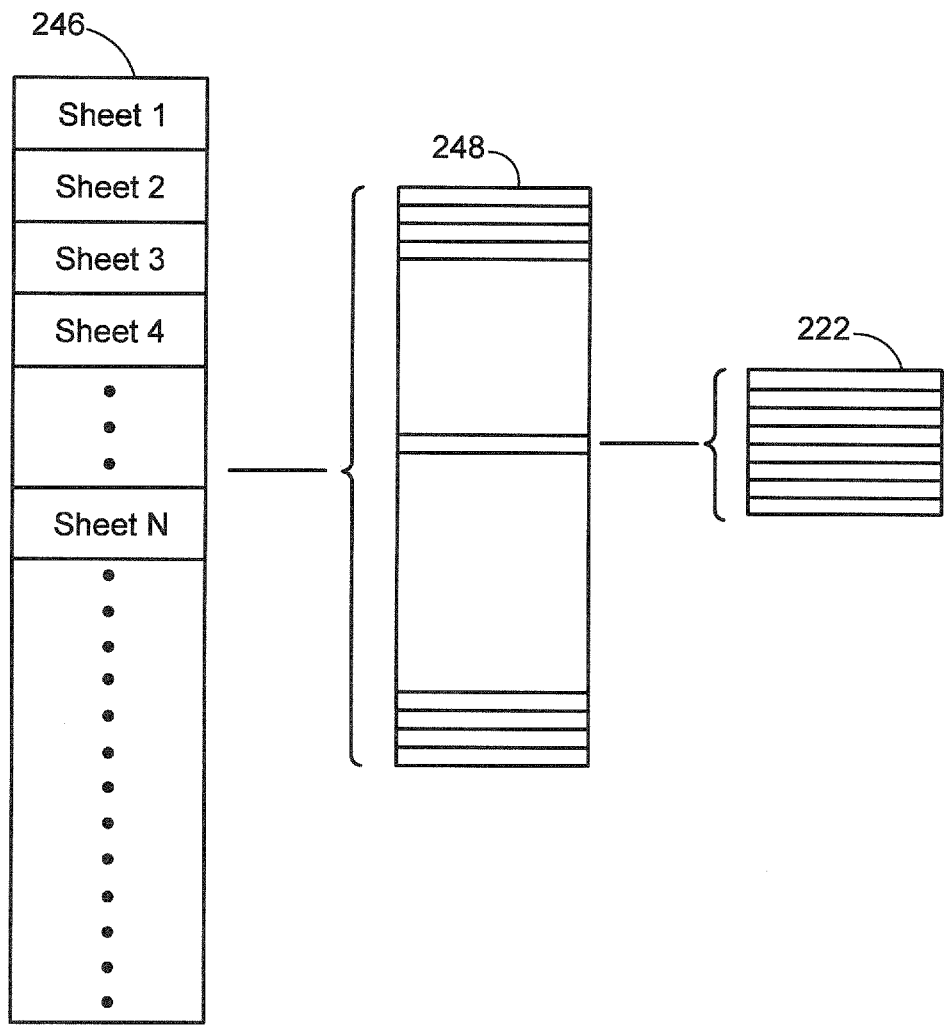
FIG. 17 diagrammatically depicts a data sheet capacity hierarchy.

FIG. 17 is a diagrammatic block diagram of a grid-based architecture that is well suited for mapping storage capacity in accordance with embodiments of the present invention. Shown in FIG. 17 is a map 246 of a plurality of numbered sheets, one of the sheets 248, and a grid 222. As described previously, the SU 222 is used generically to depict grids that entirely contain user data, can entirely contain redundant (mirror or parity) data, or can contain both.

Again, the term "metadata" is used to describe the system 100 configuration that is useful in describing the present arrangement of the storage capacity for efficient management and manipulation of the data. Metadata can be stored on the data storage device 101 and/or in other memory, such as in cache memory, for example. Portions of metadata stored on the storage device 101 may also be stored in other memory. Metadata can furthermore be associated with a logical device, such as a logical disc.

Figure 18:
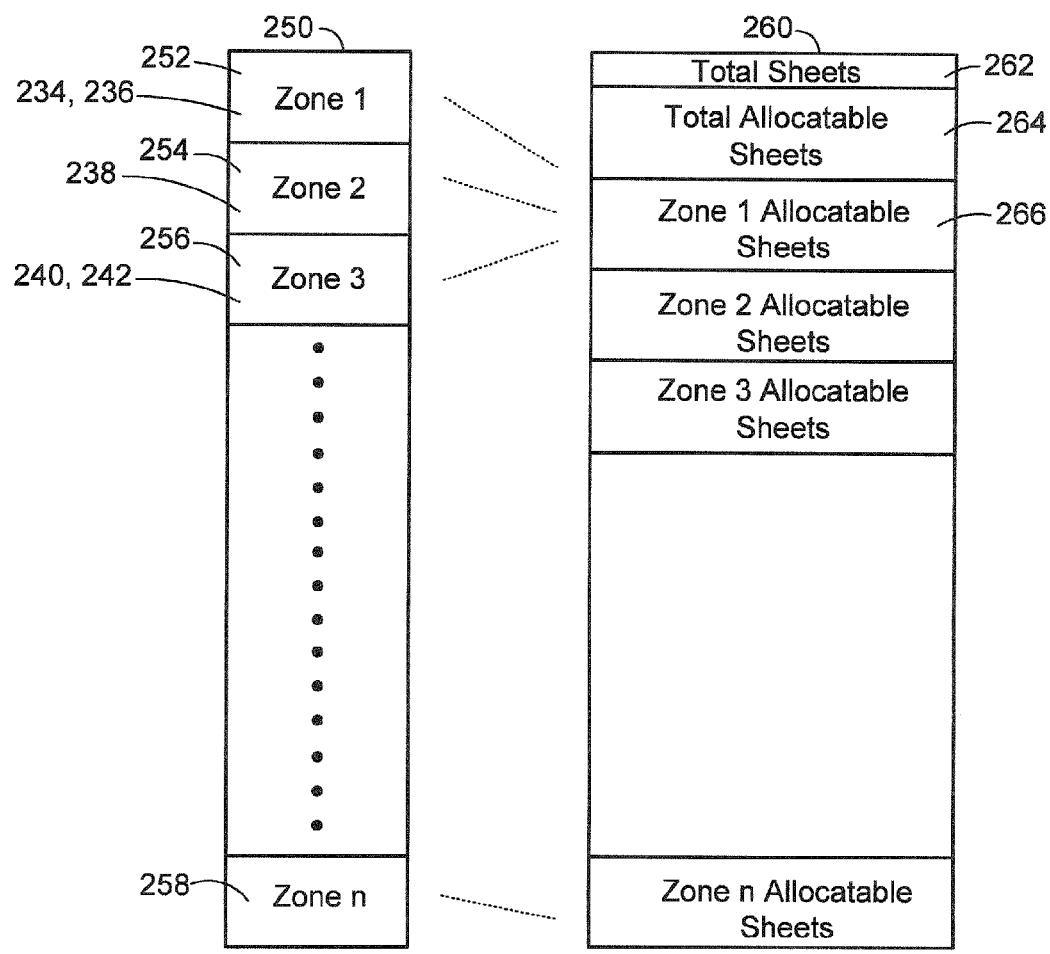
FIG. 18 diagrammatically depicts a sheet allocation map (SAM) and a sheet allocation descriptor (SAD).

FIG. 18 depicts metadata in accordance with embodiments of the present invention. A sheet allocation map (SAM) 250 is a bit array having a bit for each sheet in the book. Bits in the SAM 250 are set to a first value if corresponding sheets have been allocated, and are set to a second value if corresponding sheets are allocatable. Accordingly, the SAM 250 can be used to identify allocatable sheets. The SAM 250 is shown organized into a plurality of zones 252, 254, 256, and 258, with a preselected number of sheets per zone. That is, in the illustrative embodiments of FIG. 18, sheets 234, 236 are in zone 1 (252), sheet 238 is in zone 2 (254), and sheets 240, 242 are in zone 3 (256).

The metadata further comprises a sheet allocation descriptor (SAD) 260 providing summary information about the state of the SAM 250. The SAD 260 comprises a total number of sheets 262, the number allocatable sheets 264, and an array containing the number of allocatable sheets within the zones of the SAM 250. For example, Zone 1 allocatable sheets 266 of the SAD 260 contain the number of allocatable sheets in Zone 1 (252) of the SAM 250. Some embodiments of the present invention employ one SAM 250 and one SAD 260 for each book. Alternative embodiments of the present invention employ a single SAM 250 for a plurality of books, or can comprise multiple SAMs 250 with each SAM 250 covering a portion of a book or books. The SAD 260 simplifies identification of storage areas having allocatable sheets or a predetermined number of allocatable sheets.

Figure 19:
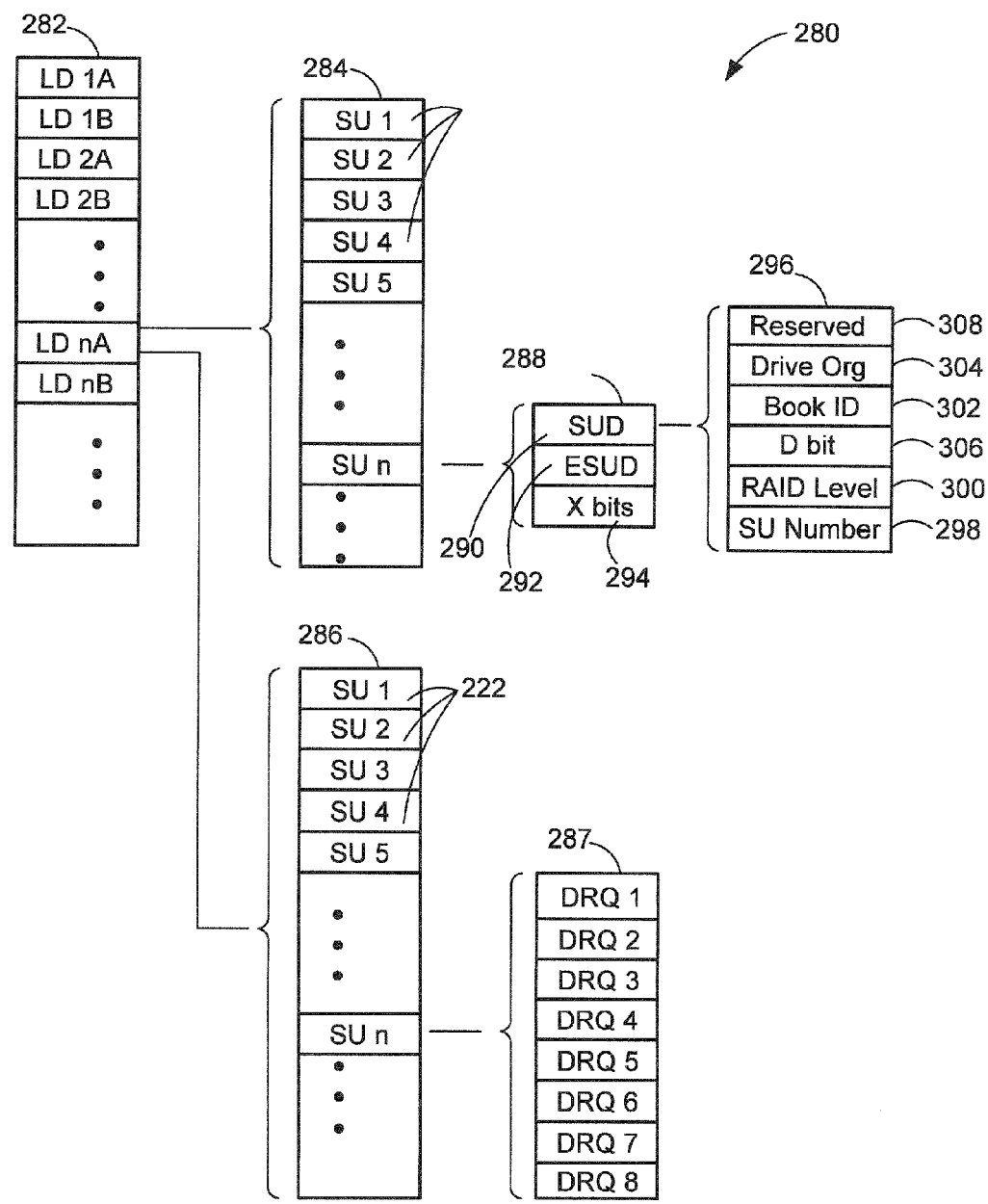
FIG. 19 diagrammatically depicts a logical device allocation map ("LDAM").

As discussed previously, the storage unit (SU) 222 (FIG. 12) is defined by a grouping of the data blocks 160 (FIG. 5A), each data block 160 being stored in one of a plurality of the data storage devices 101 (FIG. 6A) and having a data portion 162 and additional information in the formatted DIF 164 including a portion dedicated to storing a DRQ 168A indicating a validity of the respective data portion 162. Sheets 234, 236, 238, 240, 242 are each defined by two or more of the SUs 222, and each can be allocated to a logical device (LD). FIG. 19 further depicts metadata of the present embodiments in the form of a logical device allocation map (LDAM) 280 that is stored in memory and indexable by logical address to identify whether any of a plurality of the SUs 222 has at least one stored DRQ 168A indicating that the corresponding data portion 162 is invalid.

The LDAM 280 has an array 282 that is indexable by logical address. A first pointer indexes a selected logical address to a corresponding SU descriptor array 284. The SU descriptor array 284 has an entry 288 for each SU 222 corresponding to the selected logical address. The LDAM 280 has a second pointer indexing the selected logical address to a corresponding DIF array 286. The DIF array 286 is indexable to obtain DRQ bit maps for variously identifying the present distribution of invalid data portions 162 in the respective SUs 222. For instance, in some embodiments the DRQ bit maps can merely singularly identify whether any of the data blocks 162 in the one or more SUs 222 corresponding to the selected logical address has an invalid data portion 162. Preferably, the DRQ bit maps can be enlarged to give more particular information such as whether each of the SUs 222 corresponding to a logical address has one or more invalid data portions 162. Ideally, the DRQ bit maps can be large enough to individually map the data blocks 160 to identify which data blocks 160 are invalid in each of the one or more SUs 222 corresponding to the selected logical address.

Each entry 288 in the SU descriptor array 284 includes a corresponding SU descriptor 290, an extended SU descriptor 292, and X-bits 294. The X-bits 294 can be employed to indicate whether a portion of the SU 222 has been written. The SU descriptor 290 has a formatted field 296 having portions thereof dedicated to storing an SU number 298, a RAID level 300, a book ID 302, a drive organization value 304, a D-bit value 306, and reserved bits 308.

The SU number 298 and book ID 302 define a particular SU 222 in the storage capacity. The sheet version 216 (FIG. 11) of the sheet containing a particular SU 222 can be determined by dividing the SU number 298 by the number of SUs 222 in a sheet (such as by 30 in the RAID 0 234 example of FIG. 16) then dividing the result by the number of sheet organization versions (such as 5 in the example of FIG. 11) with the remainder being the sheet version. The D-bit 306 can be employed to indicate media validity. The extended SU descriptor 292 provides additional SU 222 number bits where needed for large capacity data storage devices 101.

Through allocation of sheets and SUs 222 to LDs, logical block addresses (LBAs) of data blocks 160 are virtualized as virtual block addresses (VBAs) within each LD. Restated, the SU descriptor 290 (and the extended SU descriptor 292 where applicable) maps the smallest unit of storage that can be allocated to a given LD. The LBAs of the blocks in the SU 222 are determined in part through the SU number 298, as is described further below. The LDAM 280 structure depicted in FIG. 19 is preferably indexed by LD or some other hierarchical structure in order to access the SU descriptor array 284 and DIF array 286 or a portion thereof for a particular LD. This provides flexibility and memory usage efficiency when allocating LDs that range from a small number of SUs 222 to a large number of SUs 222. Alternatively, some embodiments of the present invention employ a "flat" structure where the SU descriptor array 284 and the DIF array 286 for each LD are stored consecutively in a single array.

Figure 20:
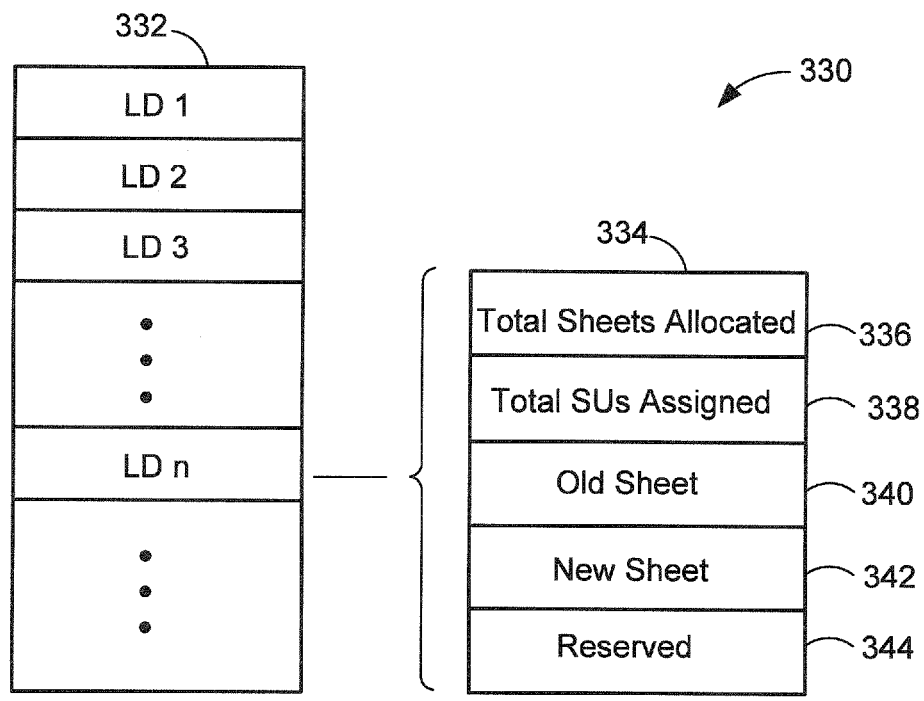
FIG. 20 diagrammatically depicts a storage unit (SU) allocation array.

FIG. 20 further depicts metadata of the present embodiments in the form of an SU allocation descriptor array 330 that provides an array 332 that is indexable by LD. Each SU allocation descriptor entry 334 comprises the total number of sheets allocated 336 to the LD, the total number of SUs 222 allocated to the LD, an old sheet pointer 340, a new sheet pointer 342, and reserved bits 344. The old sheet pointer 340 and new sheet pointer 342 can be employed to remap LDs across additional books when additional storage capacity is available. The allocation process can employ multiple book allocation where a first sheet allocated to an LD is from a first book and a second sheet allocated to the LD is from a second book, and so on. The starting book for a first allocated sheet for an LD can be determined from the LD number modulo the number of books.

Figure 21:
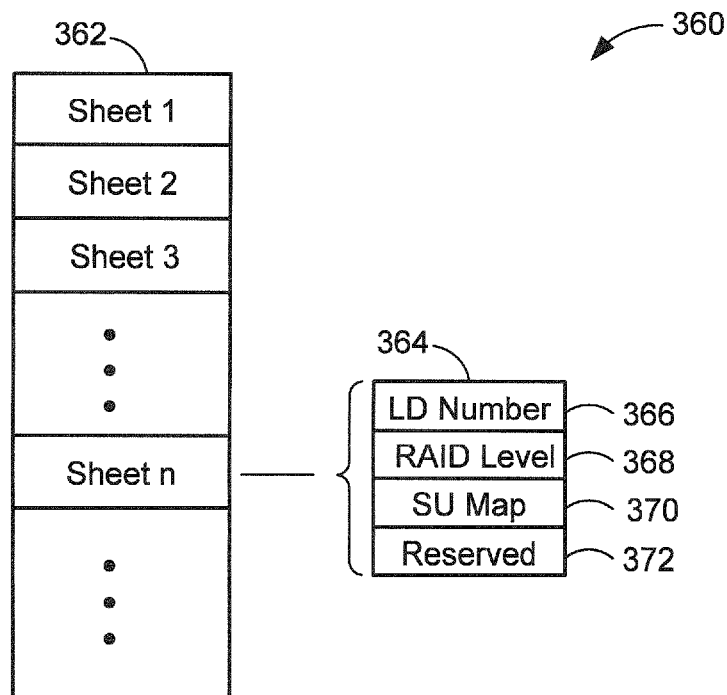
FIG. 21 is a diagrammatical depiction of a sheet allocation table.

FIG. 21 further depicts metadata of the present embodiments in the form of a sheet allocation table (SHAT) 360 that is an indexable array 362 of data about every sheet in the storage capacity. A SHAT entry 364 comprises the LD number 366 to which the respective sheet is allocated, the RAID level 368 of the sheet, an SU map 370 having bits indicating which SUs 222 in the sheet are allocated to the logical device and which SUs 222 are allocatable, and can include reserved bits 372. The RAID level 368 can include values to indicate that a conversion from one RAID level to another RAID level is in progress. The SHAT 360 can be established in memory when the LD maps are instantiated. The SHAT 360 is updated as sheets and SUs 222 are allocated to or de-allocated from an LD. The SHAT 360 can serve as an efficient resource in determining whether sufficient allocatable SUs 222 exist within a particular LD in response to an allocation request to the LD. The SHAT 360 can further serve as a metadata check for the possibility of multiple allocated (misallocated) sheets and SUs 22 during map instantiation, and can provide extra cross-checking during sheet and SU 222 allocation and de-allocation. The SHAT 360 can also provide accounting for straightforward garbage collection of partially allocated sheets in LDs, left as the result of operations like RAID level transformations and sparse de-allocations.

Figure 22:
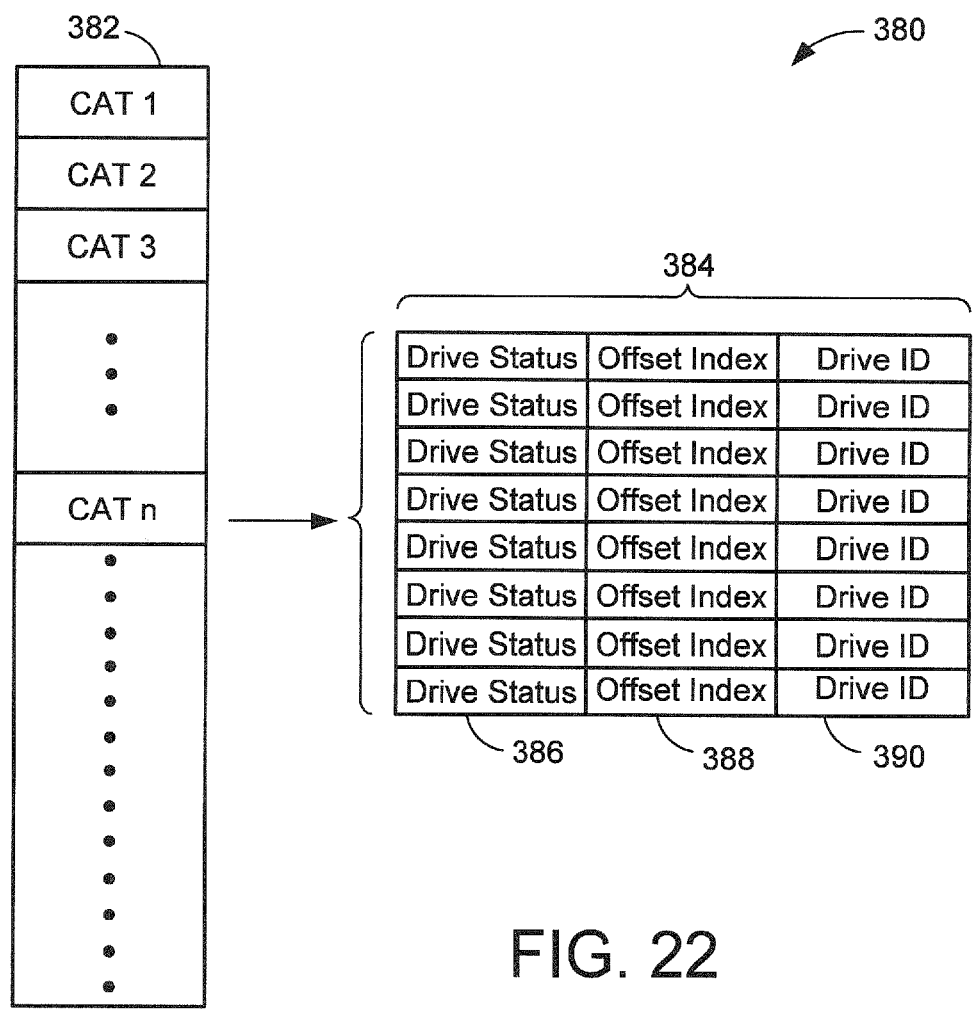
FIG. 22 is a diagrammatical depiction of a drive organization table.

FIG. 22 further depicts metadata of the present embodiments in the form of a drive organization table (DOT) 380 providing an indexable array 382 of current array table (CAT) entries 384. The number of CATs 384 in DOT 380 reflects the number of books, the number of drive organizations 304 (FIG. 19) and the number of sheet versions 216 (FIG. 11). Each CAT 384 specifies the ordered set of data storage devices 101 providing stripes 192 to the sheet. In the illustrative embodiments of FIG. 22 there are eight data storage devices 101 specified by the CAT entry 384, as might be associated with the SU 222 in FIG. 15. Each CAT entry 384 comprises drive status 386, offset index 388, and drive ID 390.

Drive status 386 comprises drive condition information, including information from reporting technology (SMART). SMART is an industry adopted standardized specification for failure warnings. SMART is based on monitoring for excessive internal data storage device 101 errors, such as bit-read errors and track-seek errors. SMART employs a failure-warning algorithm running in a data storage device's 101 microprocessor that checks whether error rates exceed a threshold value, and if such condition exists, sends a warning over the data storage device interface 122 (FIG. 3) to the host 102 (FIG. 2).

Offset index 388 can be applied to an LBA offset table to skip areas of a data storage device 101 or offset the areas accessed. The offset index 388 accesses a table to obtain the starting LBA of the partition on the particular data storage device 101. That partition is the entire contribution of data capacity from the given data storage device 101 to the respective book. Books are formed from partitions of consecutive LBAs. As noted earlier, the number of CATs 384 in the DOT 382 reflects the number of books, the number of drive organizations 304, and the number of sheet versions 216. If a data storage device 101 fails, is removed, or is otherwise out of service, it can be functionally replaced by a spare data storage device 101 designated as containing spare stripes 192. Table 2 below illustrates CAT entry 384 values corresponding to sheet version 5 (SV5) in FIG. 11. Drive status 386 is shown as a value of zero, indicating no problems; however other values and representations of drive status 386 can be employed. Drive ID 390 is shown as a letter value corresponding with the data storage device 101 denotation in FIG. 11.

TABLE 2

| Drive Status | Offset Index | Drive ID |
|---|---|---|
| 0 | 0 | C |
| 0 | 0 | E |
| 0 | 0 | G |
| 0 | 0 | I |
| 0 | 0 | D |
| 0 | 0 | F |
| 0 | 0 | H |
| 0 | 0 | J |

Table 3 below depicts the CAT 384 for sheet version 5 after data storage device 'E' has failed, has been removed or is otherwise out of service. From FIG. 11 it will be recognized that drives A and B serve as spares for sheet version 5 (SV5). Spares can be selected relative to group 218, 220, such that drive A is selected to replace drive E.

The CAT 384 is a different drive organization that is referenced from the SU descriptor 290 after the data in the SU 222 has been rearranged to conform to the new organization. Prior to the change, the SU descriptor 290 references a CAT 384 that is modified to indicate the failed drive is missing. After the change, the SU descriptor 290 is modified to reference this new CAT 384.

TABLE 3

| Drive Status | Offset Index | Drive ID |
|---|---|---|
| 0 | 0 | C |
| 0 | 0 | A |
| 0 | 0 | G |
| 0 | 0 | I |
| 0 | 0 | D |
| 0 | 0 | F |
| 0 | 0 | H |
| 0 | 0 | J |

The CAT 384 shown in Table 3 can be stored as another indexable entry 382 in DOT 380, such as CAT 10, for example. Since drive E also affects three other sheet versions 216, additional CATs 384 can be created to reflect sparing in SV1, SV2, and SV4. Data in SUs 222 employing drive E can be copied or reconstructed and stored to the spare data storage device 101 designated in the sheet version 216 of FIG. 11. Prior to copying or reconstructing data, the drive organization 304 can specify a CAT 384 prior to sparing. After copying or reconstruction, the drive organization 304 can specify a CAT 384 after sparing. Allocation of SUs 222 after a data storage device 101 failure would employ a new drive organization 304. The drive organization 304 can be updated following replacement of a failed or removed data storage device 101. CAT 384 values for the DOT 380 can be illustrated for the sheet organization table 204 of FIG. 11 as shown in Table 4:

TABLE 4

| | Drive Org 1 | Drive Org 2 | Drive Org 3 |
|---|---|---|---|
| Sheet Version 1 | 0123 5678 49 | 0124 5678 9 | 0129 5678 |
| Sheet Version 2 | 0124 5679 38 | 0124 5679 8 | 0128 5679 |
| Sheet Version 3 | 0134 5689 27 | 0124 5689 7 | 0127 5689 |
| Sheet Version 4 | 0234 5789 16 | 0214 5789 6 | 0216 5789 |
| Sheet Version 5 | 1234 6789 05 | 1204 6789 5 | 1205 6789 |

The numbers 0-9 represent the ordering of data storage devices 101 providing stripes 192 for each sheet version 216, listed as four numbers representing the first group 218, four numbers representing the second group 220, and two numbers indicating the spare data storage devices 101. Drive organization 2 (Drive Org 2) in table 4 depicts a drive organization 304 that can be implemented if data storage device 3 fails. In sheet version 1, Drive Org 2, data storage device 4 has taken the place of data storage device 3 in group 1, and data storage device 3 is shown with a strikethrough to indicate failure (or inaccessibility). Furthermore, in sheet version 1, Drive Org 3, data storage device 9 replaces failed data storage device 4. Table 4 furthermore illustrates various drive reorganization schemes for SV2, SV3 and SV4 where the same data storage devices 101 are involved.

As noted previously, the letters depicted in FIG. 11 and in the above charts indicate the participation of data storage devices 101 in a book. The combination of book ID 302 and relative drive position from a CAT 384 can be combined to form a member storage pool ordinal tag (MSPOT) that is used to access another table, such as one that provides a fibre channel arbitrated loop physical address (ALPA), to get the physical drive address. In some embodiments, the MSPOT can be produced by multiplying the book ID 302 by a number greater than or equal to the maximum number of data storage devices 101 in a book (such as sixteen in a ten data storage device 101 system, for example) and then adding the CAT 384 value specifying the member index of the data storage devices 101 providing storage capacity to the SU 222 to produce an index in a system table. Depending on the type of data storage devices 101 employed, tables can be configured to contain SCSI IDs, fibre channel IDs, or any other addresses or IDs to physically address data storage devices 101. Alternatively, and as noted earlier, the drive letters in the CAT 384 can correspond to the drive IDs 390 such as ALPAs or SCSI IDs, for example, such that an MSPOT table and MSPOT/physical drive address tables are not used.

As illustrated above, embodiments of the present invention provide a metadata structure that easily accommodates removal, failure, or addition of data storage devices 101. Additionally, the drive organizations 304 specified in the SU descriptor entry 290 simplifies management of SUs 222. For example, if a data storage device 101 has been removed, has failed, or is otherwise out of service, a second drive organization 304 can be defined. If new SUs 222 are allocated to an LD after a data storage device 101 failure, the next successive drive organization 304 can be specified in the SU descriptor 290. For previously allocated SUs 222, data can be reconstructed and the drive organization 304 changed from a first value to a second value. As such, the drive organization 304 provides an indicator of which existing SUs 222 have been reconstructed, and can allow allocation to continue following data storage device 101 removal or failure. Restated, the drive organization 304 embodiments of the present invention allow accommodation of various failure permutations through a single high-level structure.

From all the foregoing it will be recognized that the present embodiments thus generally leverage the DIF 164 tags during a test procedure on a storage system and/or on a software implementation of a storage system to detect errors, or debugging, beyond the reach of other error detection methods such as memory and bus parity or error correction coding. In those events bugs in the system will result in writing incorrect data, or writing correct data to the wrong place. The present embodiments use the DIF 164 tags to detect the problems arising from bugs, which can then be corrected by running a repair routine.

Monitoring the DIF array 287 to characterize the bugs in terms of distributions of data blocks having invalid data makes testing a large storage system practicable. A typical modern storage system can have multiple terabytes of data storage capacity. It is not practical to develop a repair tool using only the actual real hardware performance for collecting information on what results come from system bugs. The reason is that such an approach, in operation, needs to access from several billion up to several hundred billion data blocks. Thus, a single test (debugging) run would take somewhere from hours to days or even weeks to perform. That would make the development time prohibitive; to shortcut full testing prevents the adequate levels of system testing that ensure the requisite robust reliability.

The present embodiments relying on the DIF tags shortens the development cycle by providing a DIF analysis tool that simulates system testing and shortens the debugging cycle from weeks to mere minutes. A set of input/output (I/O) routines simulate data access commands in the form of write and read commands to and from the data storage space. Except for the insignificantly small metadata, only the DRQs are examined or altered by the analysis tool of the present embodiments. That equips the user with a compression mechanism by only recording DRQ tags that represent invalid data. Without the compression, a one terabyte storage system simulation would otherwise require about two billion DRQ tags, each a minimum of six bytes. That requirement for twelve gigabytes of simulated disc data is well out of the range of ordinary engineering test workstations. However, the present embodiments only record observed errors, thereby reducing the data processing load to a few megabytes of physical memory to store and process the error information. That allows the test tool to run completely out of memory, and execute in a small fraction of the time it takes to execute the actual tool—in trials observed to be about one or two minutes per terabyte of simulated disc storage capacity.

Under normal (no error) conditions the META TAG 168 portion of the DIF 164 matches values stored in the data portion 162 with expected values computed by the storage system metadata structures. By encapsulating all the various state updates into hierarchical summaries by the metadata structures described above, those data blocks 162 that are invalid can be readily identified at a very high level such as by identifying those sheets or those SUs that have at least one data block 160 with an invalid data portion 162. The hierarchical data structures can then be used to identify from the SU information just what rows, what stripes, and eventually what sectors have the invalid data stored thereto. An analytical comparison of the distribution of invalid data in any of these hierarchical levels to an expected distribution of errors is an effective tool for debugging the system.

Figure 23:
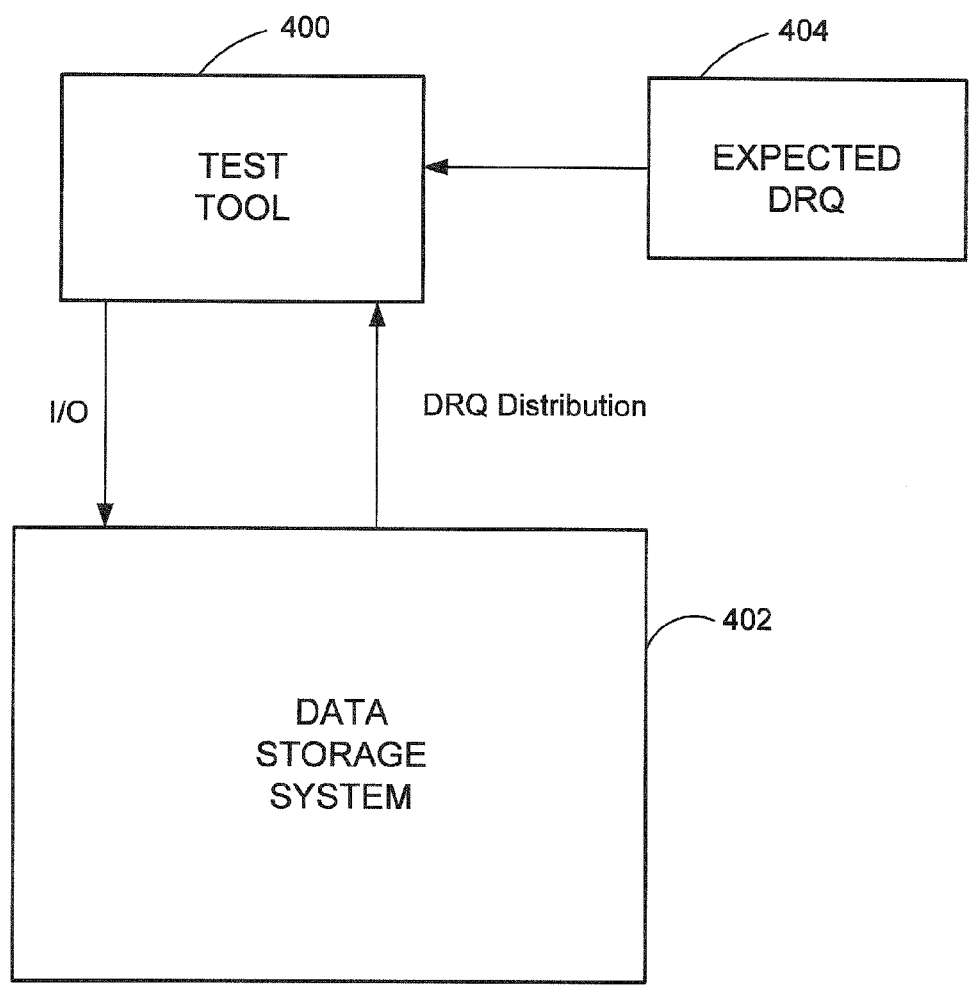
FIG. 23 diagrammatically depicts a hierarchical compression test tool constructed and operated in accordance with embodiments of the present invention.

FIG. 23 diagrammatically depicts a hierarchical compression tester 400 employing that mode of operation for debugging a large and preferably redundant storage array subsystem 402. The tester 400 is depicted as inputting an I/O command to the data storage subsystem 402, and resultingly receiving a DRQ distribution identifying at a selected hierarchical level the incidence of stored invalid data. The observed DRQ distribution is then compared to an expected DRQ distribution of invalid data provided by an analysis module 404. As described, that comparison can advantageously result in determining whether each of the storage units corresponding to the selected logical address includes an invalid data portion. Even more advantageously, that comparison can identify which data blocks in each of the storage units corresponding to the selected logical address includes an invalid data portion. Alternatively, that comparison can be made at a different hierarchical level of the grid based storage system than at the storage unit level.

In other alternative embodiments the tester 400 executes a script to inject simulated errors directly to the DRQ bit 168B portions of the DIF 164. The system response to the errors creates a DRQ distribution that can be compared to an expected distribution in the same manner described above for the tester 400 injection of an I/O command to the system 402.

Figure 24:
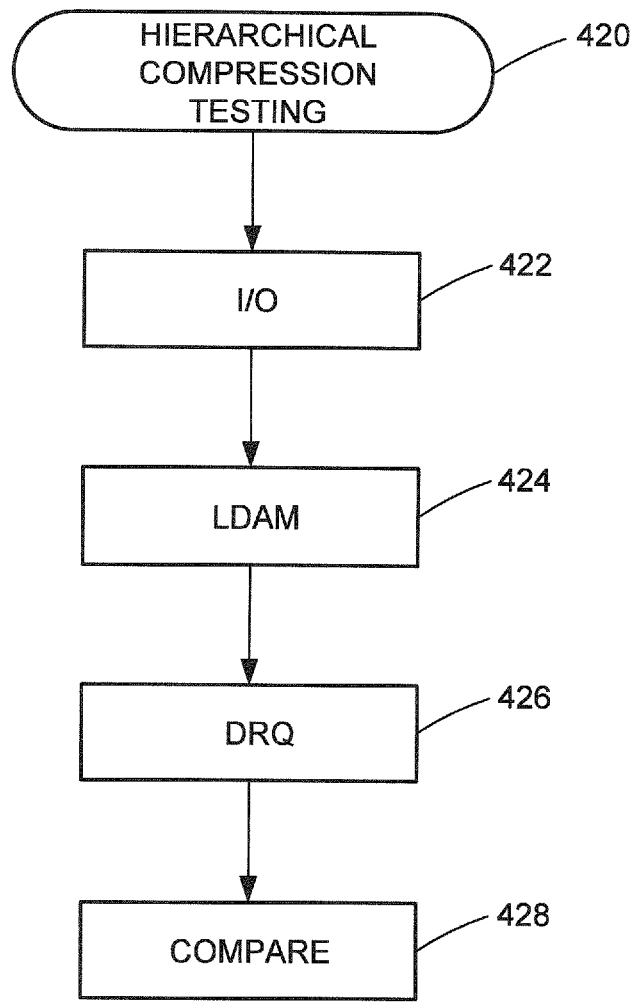
FIG. 24 is a process flowchart illustrating steps for HIERARCHICAL COMPRESSION DATA TESTING in accordance with embodiments of the present invention.

FIG. 24 is a flowchart of steps in a method 420 for HIERARCHICAL DATA COMPRESSION TESTING in accordance with embodiments of the present invention. The tester executes programming instructions to interface with the grid-based storage architecture described above that is employed by the storage subsystem. As described, in that grid-based storage system a storage unit is defined by a grouping of data blocks. Each data block is stored in one of a plurality of storage devices, and has a data portion and a data integrity field (DIF). The DIF includes a data reliability qualifier (DRQ) indicating whether the respective data portion is valid. The method 420 thus utilizes the metadata architecture described above in storing data to or reading data from the storage capacity.

The method 420 begins with the tester sending an input/output (I/O) request in block 422 that specifies an LD, at least one VBA, and an I/O operation, such as a data read or write operation. Control then passes to block 424 where the LDAM is accessed in order to index the SU descriptor array for the SUs allocated to the LD associated with the data transfer request 422. The LDAM is also accessed in order to index the DIF array in block 426 for the DRQ bit map corresponding to the SUs allocated to the LD associated with the data transfer request 422. Generally, the distribution of data blocks having invalid data from the DRQ bit map is compared in block 428 to the expected value obtained from the analysis module.

Taking a high hierarchical level comparison to the lowest hierarchical level, the corresponding SU entry can be parsed with respect to the VBA in order to determine the SU descriptor, which identifies the field containing, among other information, the drive organization, book ID, and SU number. It will be recalled from above that the sheet version of the sheet containing the desired SU can be determined by dividing the SU number by the number of SUs in a sheet, then dividing the result by the number of sheet organization versions with the remainder being the sheet version.

The DOT 380 can then be accessed to parse the indexable array according to the drive organization, book ID, and sheet version in order to determine the CAT associated with the desired SU. The book ID and the relative member positions obtained from the selected CAT can be combined to form an MSPOT. The MSPOT can be applied to an MSPOT/ALPA table or similar structure, as previously described, to obtain individual drive addresses. The SU number can be used directly to indicate the drive address, or it can be scaled, masked, offset and otherwise adjusted to produce a data LBA. The data LBA can also be modified by an offset specified by the offset index of the CAT. Additionally, the offset index can be applied to an offset table to obtain a specific offset value for each data storage device. Alternatively, a single table that combines the DOT, CAT, MSPOT and MSPOT/ALPA arrays can be employed.

Disc-based metadata of embodiments of the present invention can be allocated sheets and SUs in a manner similar to that of user data. A highly reliable data storage format, such as RAID-1×3, for example, can be employed to store disc-based metadata.

The illustrative embodiments of FIGS. 18-22 depict metadata structures that can be stored on the data storage devices to manage a grid based storage system. In addition to data storage device based metadata, metadata structures can be implemented in memory, preferably non-volatile memory, to manage the storage system. From the foregoing description it will be noted that the allocation/access metadata structures of the present invention deal only with user data SUs and are not encumbered with handling of mirror or parity SUs. That is, the allocation of a user data SU implicitly causes allocation of the associated mirror or parity data SUs. This provides increased efficiency and higher performance. Handling of mirror or parity data can be performed in a manner transparent to allocation and access processes, and can employ computer program code, tables, or other structures that reflect data and parity mapping.

Various structures described herein can be combined within the embodiments of the present invention. For example, SU descriptor array entries and DIF array entries of the LDAM can be implemented as separate arrays, can be implemented as a single array, or can be combined for each SU and indexed or linked. As a further example, SU allocation descriptor entries can be implemented as a part of the pointer pairs of the LDAM and indexed to each LD. Other data structures can be similarly combined within the embodiments of the present invention.

Although the present embodiments have been described with reference to preferred embodiments, workers skilled in the art will recognize that changes may be made in form and detail without departing from the spirit and scope of the invention.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts and values for the described variables, within the principles of the present embodiments to the full extent indicated by the broad general meaning of the terms in which the appended claims are expressed.

What is claimed:

1. An apparatus comprising:
a storage unit defined by a grouping of data blocks, each data block stored in one of a plurality of storage devices, each stored data block having a data portion and a data integrity field (DIF) including a data reliability qualifier (DRQ) indicating whether the respective data portion is valid; and
a map stored in memory and indexable by logical address identifying whether any of a plurality of the storage units has at least one stored DRQ value indicating that the corresponding data portion is invalid; and
an analysis module configured to derive an expected distribution of the invalid data portions corresponding to a predefined test command, and configured to compare the observed distribution of the invalid data portions that occur in response to the test command to the expected distribution of the invalid data portions corresponding to the test command.

2. The apparatus of claim 1 wherein the map comprises a first pointer indexing a selected logical address to a corresponding storage unit descriptor array.

3. The apparatus of claim 2 wherein the storage unit descriptor array has an entry for each storage unit corresponding to the selected logical address.

4. The apparatus of claim 3 wherein the map comprises a second pointer indexing the selected logical address to a corresponding DIF array.

5. The apparatus of claim 4 wherein the DIF array comprises a bit map that identifies whether any of the data blocks in the one or more storage units corresponding to the selected logical address includes an invalid data portion.

6. The apparatus of claim 5 wherein the DIF array bit map identifies whether each of the one or more storage units corresponding to the selected logical address includes an invalid data portion.

7. The apparatus of claim 6 wherein the DIF array bit map identifies which data blocks in each of the one or more storage units corresponding to the selected logical address includes an invalid data portion.

8. The apparatus of claim 2 wherein each entry in the storage unit descriptor array comprises a storage unit descriptor.

9. The apparatus of claim 8 wherein each storage unit descriptor comprises a field having a first portion thereof dedicated to storing a storage unit number and a second portion thereof dedicated to storing a book identification.

10. The apparatus of claim 9 wherein the field has a third portion dedicated to storing fault tolerance information.

11. The apparatus of claim 10 wherein the fault tolerance information is characterized by a redundant array of independent drives (RAID) level.

12. A hierarchical compression tester employing a grid-based storage capacity wherein a storage unit is defined by a grouping of data blocks, each data block stored in one of a plurality of storage devices, each stored data block having a data portion and a data integrity field (DIF) including a data reliability qualifier (DRQ) indicating whether the respective data portion is valid, the tester comprising a logical device allocation map having a storage unit descriptor array that identifies one or more storage units corresponding to a selected logical address, the logical device allocation map having a DIF array that identifies whether any of the data blocks in the one or more storage units corresponding to the selected logical address includes invalid data, and an analysis module that monitors the DIF array and compares an observed distribution of the invalid data that occur in response to a test command to an expected distribution of the invalid data corresponding to the test command.

13. The hierarchical compression tester of claim 12 wherein the DIF array identifies whether each of the storage units corresponding to the selected logical address includes an invalid data portion.

14. The hierarchical compression tester of claim 13 wherein the DIF array identifies which data blocks in each of the storage units corresponding to the selected logical address includes an invalid data portion.

15. A method comprising:
- receiving a data access request in a grid-based storage system in which a storage unit is defined by a grouping of data blocks, each data block stored in one of a plurality of storage devices, each stored data block having a data portion and a data integrity field (DIF) including a data reliability qualifier (DRQ) indicating whether the respective data portion is valid;
- indexing a data structure that is stored in memory according to a logical address to access a DIF array that indicates whether any of a plurality of the storage units corresponding to the logical address has an invalid data portion; and
- monitoring the DIF array to observe a distribution of the invalid data portions that occur in response to an access command; and
- comparing the observed distribution of the invalid data portions to an expected distribution of the invalid data portions corresponding to the access command.

16. The method of claim 15 wherein the indexing step is characterized by the DIF array indicating whether each of the plurality of the storage units corresponding to the logical address includes an invalid data portion.

17. The method of claim 16 wherein the indexing step is characterized by the DIF array indicating which data blocks in each of the plurality of the storage units corresponding to the logical address includes an invalid data portion.

* * * * *